United States Patent [19]
Bailey et al.

[11] Patent Number: 5,575,597
[45] Date of Patent: Nov. 19, 1996

[54] MECHANICAL MANIPULATOR

[75] Inventors: Ralph P. S. Bailey, Chanctonbury; Jerome J. Leary, Brighton, both of England

[73] Assignee: Geodetic Technology International Holdings N.V., England

[21] Appl. No.: 119,189

[22] PCT Filed: Apr. 6, 1992

[86] PCT No.: PCT/GB92/00613

§ 371 Date: Oct. 5, 1993

§ 102(e) Date: Oct. 5, 1993

[87] PCT Pub. No.: WO92/17313

PCT Pub. Date: Oct. 15, 1992

[30] Foreign Application Priority Data

Apr. 5, 1991 [GB] United Kingdom ............ 9107207

[51] Int. Cl.$^6$ .................. B23C 1/12; B25J 9/10
[52] U.S. Cl. ............ 409/201; 74/89.15; 408/234; 408/236; 409/211; 409/216; 901/23; 901/29
[58] Field of Search ............ 74/89.15, 479 BP, 74/479 BW; 901/28, 29, 41, 14, 19, 23; 414/680, 729; 403/DIG. 1; 408/110, 111, 112, 236, 712, 88, 89, 234; 409/201, 211, 216, 221, 230

[56] References Cited

U.S. PATENT DOCUMENTS

| | | | |
|---|---|---|---|
| 2,561,923 | 7/1951 | Harmon | 403/DIG. 1 |
| 4,038,775 | 8/1977 | Sato | 403/DIG. 1 |
| 4,776,749 | 10/1988 | Wangenberg et al. | 408/237 |
| 4,872,291 | 10/1989 | Lindsey et al. | |
| 4,988,244 | 1/1991 | Sheldon et al. | |
| 5,028,180 | 7/1991 | Sheldon et al. | |
| 5,388,935 | 2/1995 | Sheldon | 901/23 |
| 5,401,128 | 3/1995 | Lindem et al. | 409/201 |

FOREIGN PATENT DOCUMENTS

| | | | |
|---|---|---|---|
| 0534585A2 | 3/1993 | European Pat. Off. | |
| 100974 | 4/1962 | Netherlands | 403/DIG. 1 |
| 1049244 | 10/1983 | U.S.S.R. | 901/23 |
| 1222538 | 4/1986 | U.S.S.R. | 901/14 |
| 1224137 | 4/1986 | U.S.S.R. | 901/23 |
| 1437211 | 11/1988 | U.S.S.R. | 901/28 |
| 2083795 | 3/1982 | United Kingdom. | |
| WO91/03145 | 3/1991 | WIPO. | |

*Primary Examiner*—Daniel W. Howell
*Attorney, Agent, or Firm*—Venable, Baetjer, Howard & Civiletti, LLP

[57] ABSTRACT

The present invention relates to a computer aided design and manufacturing system. The system comprises a platform suspended by means of three pairs of supportive legs which are coupled at triangularly spaced-apart locations by means of three universal joints, each of which couples to one end of each of the two legs of a respective pair. The two legs of each pair extend from their respective universal joint in divergent directions to spaced-apart locations in an overhead mounting where each leg is drivingly engaged by a respective gimbal-mounted electric motor arranged to move the leg in its own longitudinal direction. The platform position and orientation can be controlled by appropriate operation of the six leg drive motors. A rotary indexing stage is mounted on the platform for rotation in the plane of the platform under control of a further electric motor and serves as a mounting for a stage providing for pivotal movement in a plane perpendicular to the plane of rotation of the indexing stage, such pivotal movement being effected under the control of yet a further electric motor. Mounted on the pivotal stage is a rotary tool holder arranged to be driven by yet another electric motor. The various electric motors are precisely positionable under computer control for effecting automatic manufacture of an object by cutting the object out of a block of material by means of a tool held in the tool holder.

44 Claims, 13 Drawing Sheets

MECHANICAL MANIPULATOR

FIELD OF THE INVENTION

This invention generally concerns an improved mechanical manipulator and more particularly, though not exclusively, relates to a new concept in machine tooling which enables the restrictions imposed by conventional orthogonal axis machine tools to be comprehensively overcome. While the invention will be described hereinafter with reference to a machine tool embodiment, those possessed of the appropriate skills and imagination will readily appreciate that the invention is capable of wider application.

BACKGROUND OF THE INVENTION

Apart from the use of computers to control movement increments, machine tools have changed little in their operating principles in the past hundred years. Modern machine tools rely upon the provision of a series of movement axes, stacked one after another, enabling an operator to effect independent movement in each axis. To keep such an arrangement stiff requires heavy and bulky mechanisms which in turn constrains the freedom of available movement. The pinnacle of modern day machine tool technology is the computer numerically controlled (CNC) five-axis mill which enables smoothly flowing curved surfaces to be produced. The cost of such CNC machines is typically of the order of hundreds of thousands of pounds, excluding the cost of essential complex computer aided manufacturing (CAM) software.

Computer aided design (CAD) systems have been developed and are widely used which far outstrip the abilities of machine tool based CAM systems, and there is a recognised need to bridge this gap and enable companies more readily to translate their CAD developments into CAM hardware. The product that hitherto has come closest to satisfying this requirement, at least for model making applications, is the stereolithography (SLA) system developed by 3D Systems Inc. In this SLA system models are "grown" in a vat of photo-polymer by scanning cross-sections with an ultraviolet laser. The technique offers poor initial surface finish, uses a very expensive and specialised material, is very slow, and furthermore is very expensive to install; despite these serious limitations the interest that has been stimulated by the SLA system has led to the development of several equivalent processes utilizing different chemical reactions by major league international industrial corporations. Other high technology proposals reportedly under development include the fusing of plastics beads by the heat of a laser beam and the deposition of plastics from molten droplets. The development of such sophisticatedly complex systems, despite their self-evident disadvantages, is a clear indication that industry has turned its back on the possibility of conventional machine tools being developed to such a level of sophistication as to enable the goal of what might be called desk-top manufacturing to be achieved.

OBJECTS AND SUMMARY OF THE INVENTION

As mentioned in the foregoing, in modern industry much of the design of new products and components is achieved by CAD systems, but it has been a difficult and expensive route to produce the thus-designed objects directly from the CAD data. The problems have been the limited range of movement of current machine tools and their high cost, their inability to recognise their own workspace to plan complex motion activity, and the technical expertise necessary for users to utilize CAM software. The present invention aims to provide new solutions in all of these areas, and more particularly proposes their embodiment into a part manufacturing peripheral enabling desk-top manufacturing.

According to the present invention in one of its aspects, therefore, there is provided a mechanical movement system wherein means defining a platform base for further manipulative movement is mounted for movement with substantial freedom in translation and rotation by means of a plurality of legs the length and angular orientation whereof is controllably adjustable. In an exemplary embodiment which will be described in detail hereinafter, the platform has three pairs of supportive legs coupled thereto at triangularly spaced-apart locations by means of three universal joints each of which couples to one end of each of the two legs of the respective pair, and the two legs of each pair extend from their respective universal joint in divergent directions to spaced-apart locations in a mounting whereat each leg is drivingly engaged by a motor for moving the leg in its own longitudinal direction, there being six such motors mounted at spaced-apart locations in the mounting in a manner such as to accommodate the pivotal movements of the legs that will accompany their length variations.

Each pair of legs thus defines a triangle of support for the platform with the apex of the triangle coupled to the platform by means of the universal joint, the base of the triangle defined by the separation between the mounted motors which drive the respective legs, and the leg lengths being independently adjustable by operation of the motors. With the platform supported by three such support triangles and all six legs independently adjustable, the position and orientation of the platform becomes infinitely adjustable within the limits of accommodation of the universal joints and the motor-mountings.

The invention proposes to add further degrees of freedom to this range of movement by providing, for example, a first rotary member mounted on the platform and arranged to be motor driven to any required position within a plane of rotation generally parallel to the platform, and a second rotary or pivotal member mounted on the first rotary member and arranged to be motor driven to any required position (within defined limits) within a plane transverse to the plane of rotation of the first member. The last-mentioned, second rotary or pivotal member may advantageously serve as a mounting for an effector, for example a further rotary motor carrying a tool holder in the case where the apparatus is adapted for use as a machine tool, or a suitable "hand" in a robotics application.

For coupling the pairs of supportive legs to the platform, the present invention proposes to utilize universal joints comprising a first member of spherical form constrained within a complementary recess of spherical form in a second member, and wherein the constraining of the first member in the recess of the second member is effected magnetically.

The rotary member that is mounted on the platform may advantageously co-operate with the platform by means of a system providing for relative rotation between first and second members and wherein bearing surfaces of said first and second members are each formed with a plurality of radially spaced apart annular grooves, the grooves of one member being complementary to those of the other whereby the two sets of grooves interengage with each other for determining the axis of relative rotation of the two members. Furthermore the grooves provided in such a system may advantageously include spherical surfaces such that the mating of the two members simulates the mating of a spherical member into a complementary socket. Such a relative rotation system may additionally or alternatively be utilized between other components of the mechanical movement system of the invention.

For monitoring or effecting the degree of rotation of a rotary element, the present invention proposes an arrangement comprising a spur gear formed on said rotary element, first and second pinion gears engaged with said spur gear, first and second secondary spur gears arranged to be rotated by respective ones of said pinion gears, one of said secondary spur gears having circumferential spring biassing, and a third pinion gear driven by both of said first and secondary spur gears and arranged for monitoring or effecting the degree of rotation of the rotary element.

The drive means for the supportive legs may comprise electric motors mounted in precision gimbals providing the requisite degree of motor movement for accommodating pivotal movements of the legs, or alternatively the invention may utilize a precision drive arrangement comprising a spherical ball within which there is housed an electric motor having an axial hollow drive shaft through which said elongate rectilinear member is adapted to extend with a driving interaction between the motor and the elongate member, an annular mounting collar for said spherical ball having an internal part-spherical surface complementary to the spherical surface of the ball and contiguous with the ball surface, and means interacting between the surface of the spherical ball and the contiguous internal surface of the annular collar for permitting relative rotational movement of the ball and the collar except in a direction about the axis of the motor drive shaft.

By use of sophisticated mechanical engineering techniques coupled with precision motors the present invention enables the provision, as will hereinafter be described, of a desk-top manufacturing system enabling computer aided manufacturing (CAM) directly from the output of a CAD system. An entire mathematical object model as produced by an industry standard three-dimensional CAD system is sent to the machine according to the invention and the machine has sufficient machine intelligence to determine an integrated strategy to manufacture the entire model without significant user intervention.

The above and further aspects and features of the present invention are set forth with particularity in the appended claims wherein the independent claims are directed to different aspects of the present invention and will be clearly understood from consideration of the following detailed description of an exemplary embodiment and modifications thereof as illustrated in the accompanying drawings.

DETAILED DESCRIPTION OF THE EMBODIMENT

Figure 1:
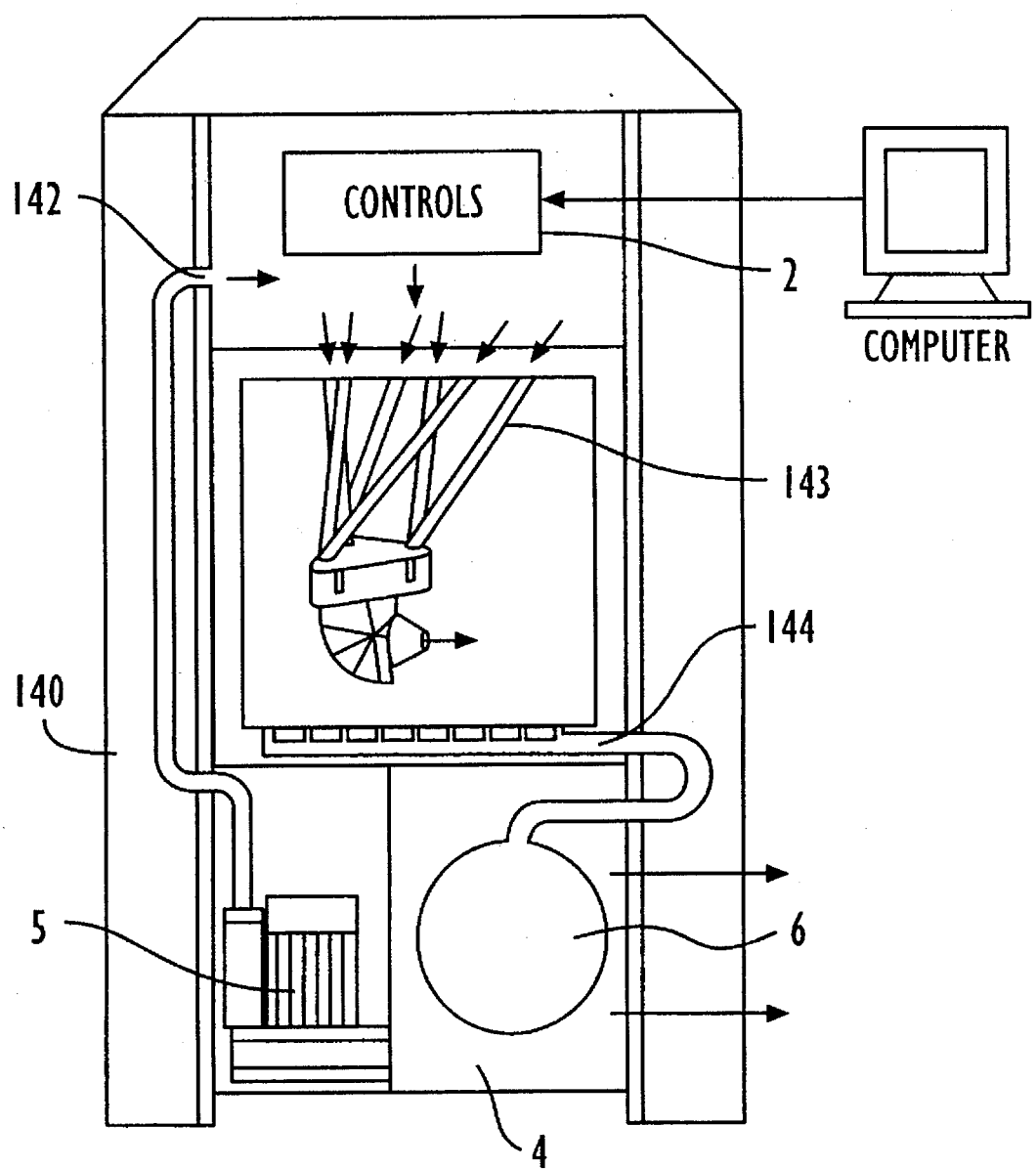
FIG. 1 shows a schematic view of an embodiment of the present invention designed for use as a CAM system.
Figure 3:
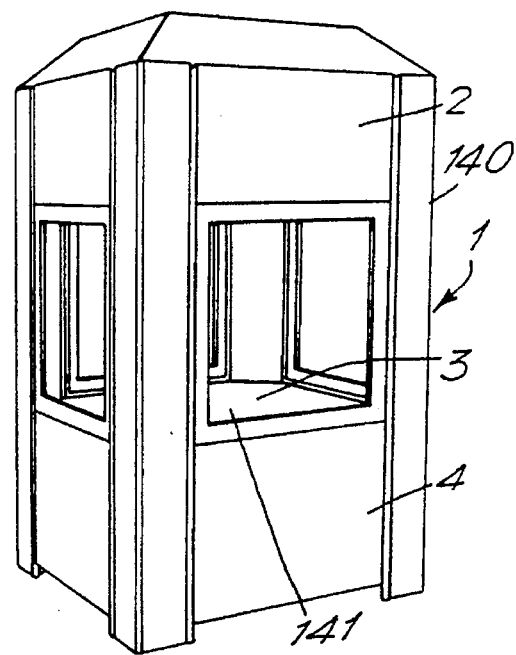
FIG. 3 is a perspective view of the cabinet of the system of FIG. 1.
Figure 2:
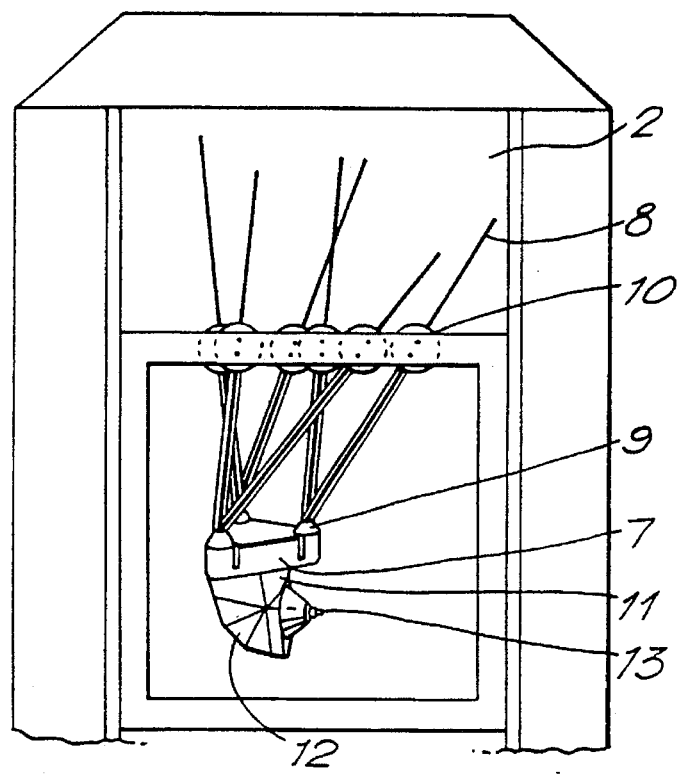
FIG. 2 shows an enlarged view of core parts of the system of FIG. 1.
Figure 4:
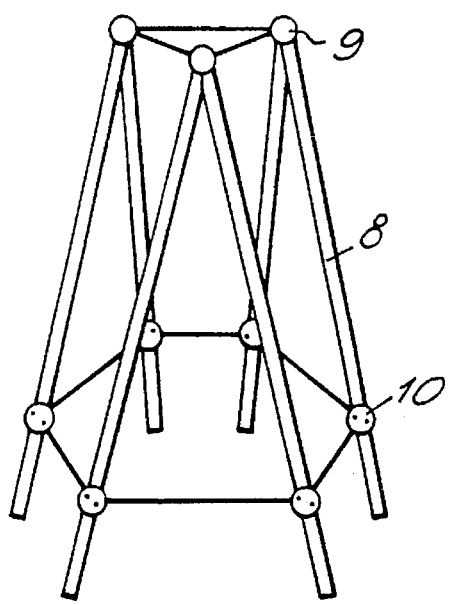
FIGS. 4 to 7 are schematic views useful for explaining the platform mounting arrangement in the system of FIG. 1.

Referring first to FIGS. 1, 2 and 3, these provide an overview of an exemplary part-manufacturing computer peripheral in accordance with the present invention. The apparatus comprises a cabinet 1, shown in detail in FIG. 3, which is formed as three compartments, namely an upper compartment 2 which inter alia provides a mounting for the leg drive motors, a central working compartment 3 which defines the workspace of the machine and provides a mounting for the workpiece being manufactured, and a lower compartment 4 which serves to house the machine electronics and additionally houses an air blower 5 and vacuum-operated swarf collection equipment 6. Within the central working compartment 3, a platform 7 is suspended by means of three pairs of legs 8, each pair of legs defining a support triangle having its apex coupled to the platform 7 by means of a universal joint 9 and its opposed base defined by two spaced-apart drive motors 10 which are mounted in gimbals in the floor of the upper compartment 2 of the machine and each of which drivingly engages a respective one of the legs 8 for moving the same in the direction of its length. The six leg drive motors 10 are individually controllable to determine the lengths of the support legs from the motors to the platform and thus to determine the spatial position and orientation of the platform 7 within the range of permissible movement of the drive motor mounting gimbals and of the universal joints 9. To the underside of the platform 7 there is coupled a rotary indexing stage 11 which can be positioned in any selected one of a plurality of predetermined angular orientations with respect to the platform, the indexing stage rotating in a plane parallel to that of the platform 7. The indexing stage 11 itself carries a further index stage 12 acting in a plane orthogonal to the plane of action of the stage 11, and a rotary effector 13 is coupled to the second index stage 12 for effecting rotation in a further orthogonal plane.

The method by which the effector 13 is moved along five axis pathways is based on a geodetic platform whose leg lengths can be independently varied under computer control. Such an arrangement confers inherent stiffness to the platform, as the legs suffer stress primarily in either tension or compression, rather than the bending moments of cartesian frameworks. The movement of the platform is extended by enabling a higher ratio between the compressed and extended leg lengths, by providing more stiffness and freedom of movement in the universal joints, and by adjusting the ratio between the base size and the platform to enhance dexterity and improve stiffness when at reach. The legs 8 are arranged such that their effective length is adjustable by driving them under controlled power through the gimbals or universal joints 10 at the base of the framework. This allows the legs to compress to the minimum length required to accommodate the leg end fittings, whilst maximum extension is restricted only by the chosen overall leg length. One consequence of this arrangement is that unless the driven legs can pass through a common pivot point, which is difficult mechanically, or suffer an undesirable moving pivot point, they could in theory collide into each other at various angles and extensions as their lengths are adjusted. This can however readily be avoided as a practical matter by appropriate selection of the system geometry with regard to the required manoeuvrability of the platform. The preferred system geometry is that described by FIG. 5. Legs joining at the platform 7 do not give rise to complications because they do not need to drive through their pivot points. By virtue of the fact that the legs of each pair share a common focal point 9 so as to describe a triangle with their respective driven pivot points 10, bending moments in the platform are avoided and stiffness is promoted by producing the lowest gearing between leg extension and platform movement. Similarly framework stiffness is improved as the triangles the legs describe approach equilateral. This is promoted by maximising the separation between the three pairs of driven base points 10 until the worsening trigonometric gearing reduces the ability to tilt the platform 7, particularly at high compressions, and subsequent workpiece restrictions become dominant because of the increased swept volume of the mechanism.

Figure 5:
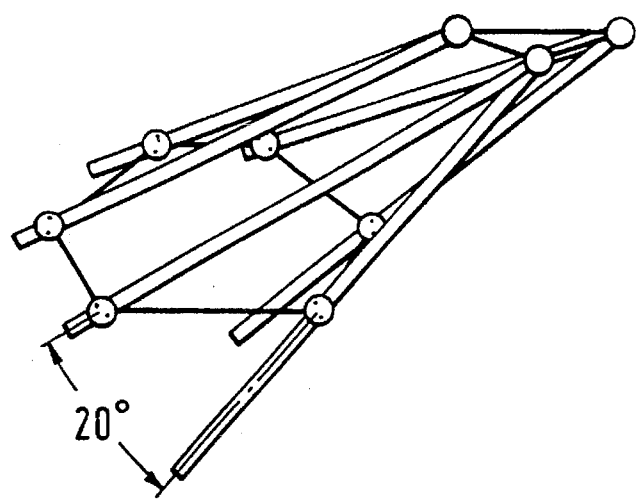
Figure 6:
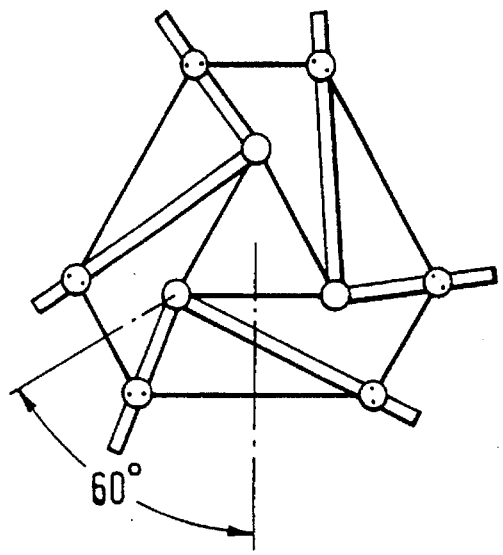
Figure 7:
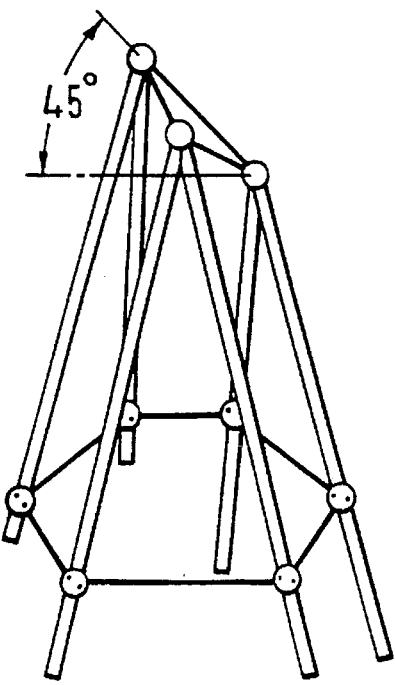
Figure 8:
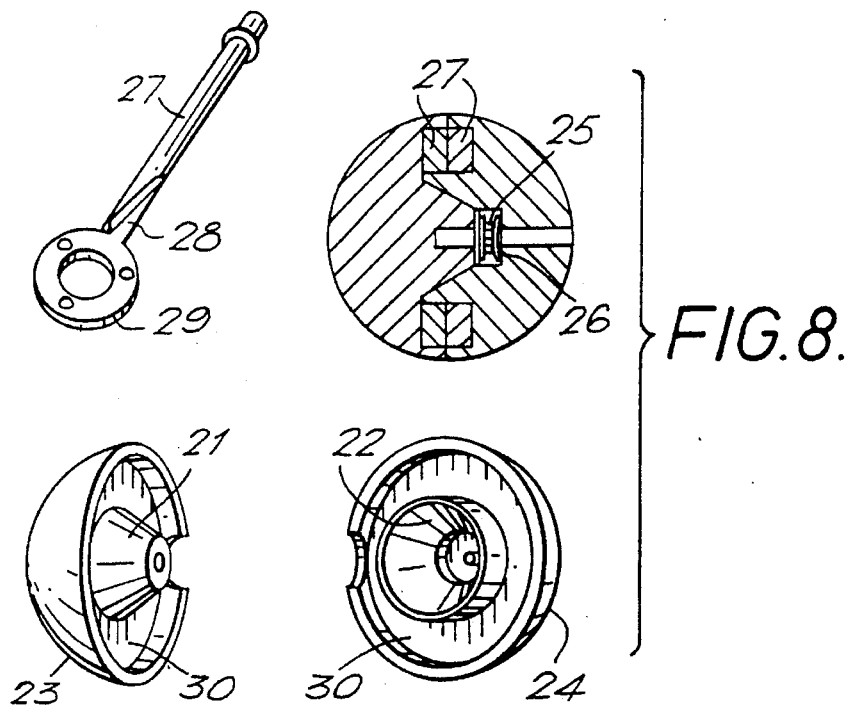
FIGS. 8 to 12 illustrate universal joint systems for coupling the mounting legs to the platform in the system of FIG. 1.
Figure 9:
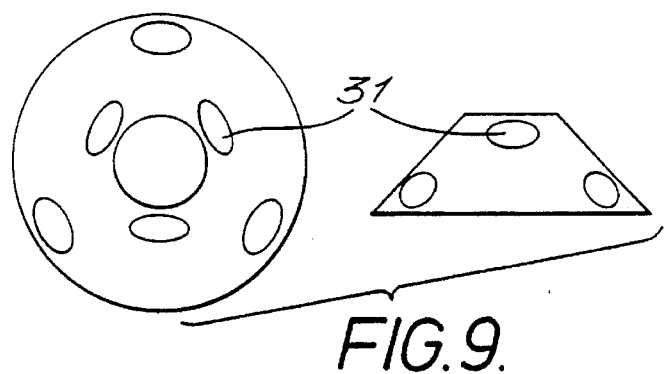

In order to optimize the manoeuvrability of the platform 7, the universal joints 9 which join the legs 8 to the platform 7 must be such as to allow the legs to form as small an angle between themselves as is necessary to accommodate displacements such as are shown in FIG. 5, must be able to rotate about each other to such an extent as to enable the platform to be rotated as shown in FIG. 6, and must be able to achieve an angle of inclination such as to maximise the tilt angle of the platform with respect to the base as shown in FIG. 7. All of these factors act simultaneously. In addition, to accommodate drive arrangements where leg length is effected by leg rotation as in screw based systems, the leg ends at the platform must be constrained against unpredictable gyrations. All of these requirements are accommodated by the universal joint constructions described hereinafter with reference to FIGS. 8, 9, 10 and 11 wherein FIGS. 8 and 9 illustrate a ball adapted to fit a magnetic socket illustrated in FIGS. 10 and 11. In these arrangements a magnet system retains a ball within a socket by magnetic attraction with the ball becoming part of the magnetic circuit. The ball is bifurcated, with each half having an associated strut which in turn can connect to the leg ends. The ball can rotate freely about any axis, and the two halves of the ball are constrained so that they can only rotate about a common axis with respect to each other, and yet still form a good common sphere.

In the ball construction that is shown in FIG. 8, matching conical profiles 21 and 22, one male and one female, are lapped into the two ball halves 23 and 24 and are coated with a viscous hydro-dynamic lubricant. A thrust bearing 25 allows the two halves to be tensioned together up to a pre-load established by the disk spring 26. The resulting ball is spherically lapped at various angles of rotation between the two ball halves. This causes the bifurcated ball to be honed to sphericity about its true common axis and focal point. Each half of the ball is then connected to a strut 27 which is cut away at 28 to permit the pair of struts to close up to the desired minimum angle as shown in FIG. 5, the struts 27 having annular end portions 29 which fit into channels 30 cut into the facing surfaces of the two ball halves. In an alternative ball construction the two lubricated cones are replaced by a cone and an arrangement of bearing pads as shown in FIG. 9. The bearing pads 31 can be coated with a polymeric material such as a thin film (2–3 micron) PTFE preparation. Once the conical bearing surfaces have been prepared to a high degree of uniformity, the pads can be bonded into position in situ. When a pre-load force is established to hold the arrangement together (for example as in FIG. 8) the pads kinematically constrain relative movement to axial rotation only. As the system is exercised, some polymeric material will transfer to the cones but the situation will soon stabilise at a minimal dimensional change.

Figure 10:
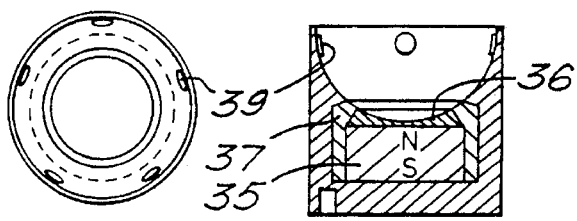
Figure 11:
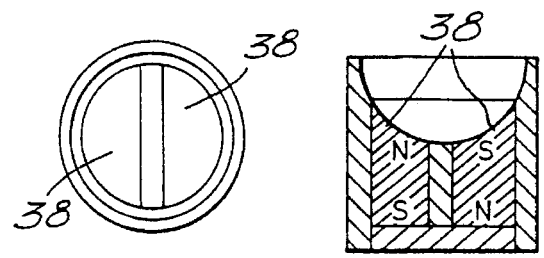

The magnetic sockets which co-operate with the above-described balls illustrated in FIGS. 10 and 11. The ball-receiving socket recesses are each coated with a hydro-dynamic lubricant to promote the averaging of surface errors between the socket and its ball, whilst maintaining a minimum ball to socket separation. The ball or the socket may feature a second order surface roughness or engraved pattern to promote lubricant retention. Because the ball is retained in the socket by magnetic attraction, rather than by virtue of the socket holding more than a hemispherical part of the ball as in a conventional ball and socket joint, the resulting universal joint can accommodate a very low angle of strut inclination thereby satisfying the conditions described by FIGS. 5 and 7. The magnetic circuit is arranged such that the maximum attraction is felt in the bottom of the socket. This is achieved in the construction of FIG. 10 by concentrating the flux from magnet 35 with a soft iron pole piece 36 in the centre of the circuit, and then by minimizing the open distance to the counter pole 37 up to the point that flux loss through the gap rather than the shorting ball becomes unacceptable. It has been determined that using this arrangement, a Neodinium-Iron-Boron magnet of 24 mm diameter and 19 mm depth can retain a 37 mm ball in a 39 mm socket with a vertical pull out holding force of 35 kgs. It has been found that in lubricated systems, atmospheric pressure can be a significant influence in ball retention, especially against shock or transient forces. This can be encouraged by providing a lip seal around the circumference of the socket to inhibit inrush of air. An alternative arrangement could dispense with the centre pole piece 36 and feature this portion of the socket ground directly into the upper surface of magnet 35. In this scenario, if high flux magnets that are nearly fully saturated are employed, flux concentration through magnet shaping is not productive; however the previous magnet to pole piece flux insulating interface has been avoided. A further alternative arrangement as shown in FIG. 11 features two or more magnets 38 lying along the length of the socket with opposite poles facing inwards, the socket being formed either in the ends of the magnets or by provision of equivalent pole pieces.

Regardless of the manner in which the ball is attracted into the socket, an alternative to ball socket lubrication is suspension between kinematically acting bearing pads. As shown in FIG. 10, a minimum of five such pads 39 may be employed to accommodate the situation where any of the pads, but only one of them, might come to be located on the bifurcated ball seam. Such pads must be very stiff to control the air gap in the bottom of the socket. A suitable material has been found to be very thin (2–3 micron) polymeric film such as PTFE. The pads can be cast into position in situ temporarily using a thin removable film such as 'clingfilm' to establish the necessary minimum air gap in the bottom of the socket. In a ball and socket joint able to tolerate a less severe angle of strut inclination such that the socket can be greater than a hemisphere, a ring of polymeric bearing pads can be tensioned down using a pre-load technique to provide the retaining force to be countered by a lubricated socket or further ring of polymeric pads.

Figure 12A:
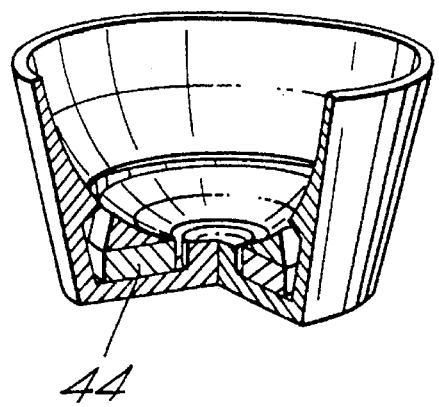
Figure 12B:
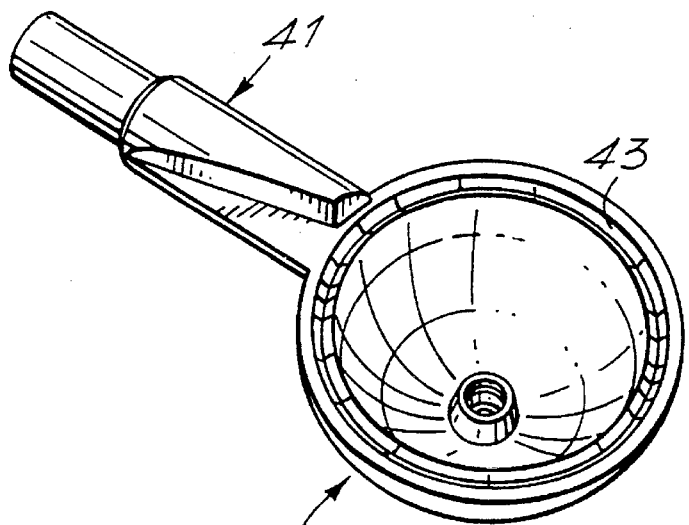
Figure 12C:
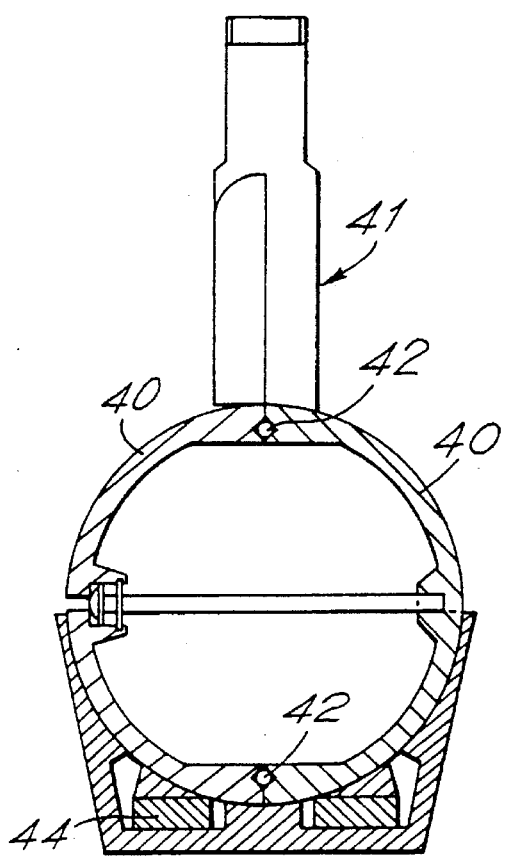

In another form of magnetic ball and socket joint, the retaining force can be maximised with respect to the mass of the unit by enabling the magnetic flux to short through the ball pole piece on more than one annulus, thereby reducing the flux through any one annulus and hence enabling the ball to be substantially hollow without saturating the magnetic flux within its material. In addition the magnetic force on the ball can be effected deeper in the socket where a higher proportion of the force will retain the ball, rather than being cancelled out by the equal and opposite forces on either side of the socket. Such an arrangement is illustrated in FIGS. 12A, 12B and 12C wherein FIG. 12A is a part sectional perspective view of the magnetic socket, FIG. 12B is a perspective view of one half of the ball and FIG. 12C shows how the parts fit together. The ball is formed in two halves one of which is shown in FIG. 12B, and each half 40 has a strut 41 attached for subsequent connection to the powered legs. The ball is hollow and is held together by means of a tie rod passing through its centre between the poles of the two halves. The tie rod is tensioned against a disk spring behind a thrust bearing, such that the two halves are held together by a predictable force but can revolve about their common axis. The two halves are separated by ball bearings 42 running between annular grooves 43 in the rim of each half, and these also serve to constrain their rotation to a common axis. The magnetic socket shown in FIG. 12A uses an annular rare earth magnet 44 arranged such that flux return paths are provided through the centre as well as through the outside of the magnet. The wall thicknesses of the ball and return paths are determined to maintain near constant flux densities throughout the system, thus enabling a minimum amount of material to be employed and assisting in the minimization of the system inertia. The bifurcated ball is suspended in its socket with a hydro-dynamic internal shear lubricant interface.

Although the range of movement of the basic geodetic structure employed by the invention is optimized by the described provisions, it is still limited, particularly in orthogonal 'a', 'b' and 'c' rotations, to approximately between ±30 to 45 degrees as shown by FIGS. 5, 6 and 7. An ideal machine arrangement would extend this to better than ±90 degrees to minimise the number of re-jigging exercises that may be necessary to permit overall object machining or to compete with the dexterity of a conventional robot geometry. As is explained hereinafter, the present invention achieves this by provision of means which effectively transforms the available 'a' and 'b' angular movements into the desired plane of activity. An indexing system coupled to the platform 7 allows the machine to settle at a highly repeatable 'a' and 'c' offset angle not constrained by the geodetic geometry, from which fully variable 'x', 'y', 'z', and 'a', 'b' and 'c' axes can then act. Compared to the provision of a fully variable additional axis, this arrangement is easier to construct, more compact, stiffer and more repeatable. An exemplary kinematic indexing stage suitable for this role will be described hereinafter with reference to FIG. 13.

Figure 13:
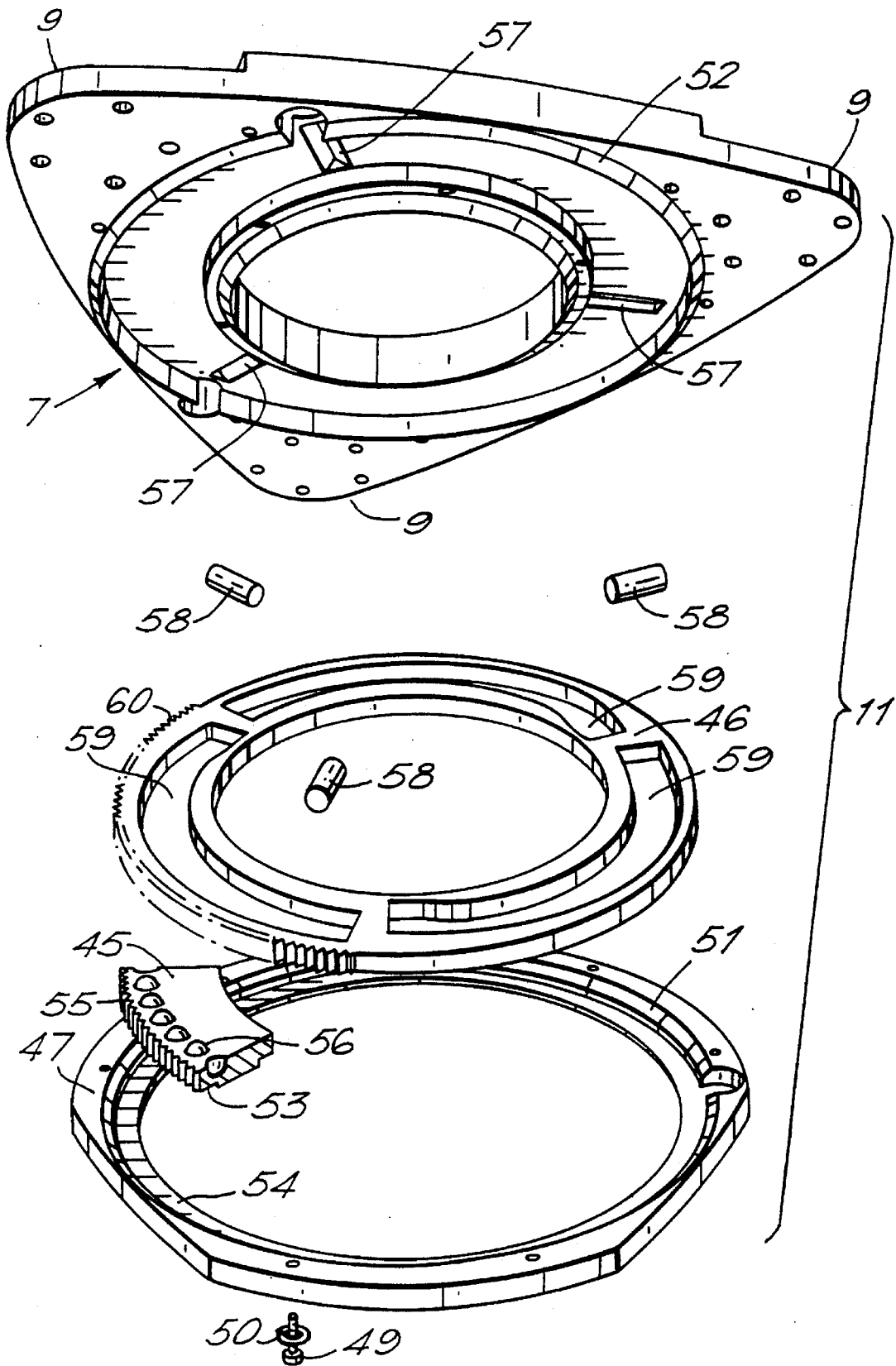
FIG. 13 is an exploded view of a rotary indexing stage that is affixed to the platform in the system of FIG. 1.

Referring to FIG. 13, the underside of platform 7 is shown in perspective view and mounting locations for the socket parts of the three universal joints 9 can be seen. The indexing stage 11 illustrated in exploded view has the function to enable a rigid disc 45 to be rotated in a plane parallel to the plane of platform 7 to any one of a plurality of predetermined positions with an accuracy of better than 1 degree, and as is described hereinafter the disc 45 itself serves as a mounting for further movement stages. The disc 45, sandwiched with a cam disc 46, is retained to the underside of platform 7 by means of annular swash plate 47 which is adapted to be secured to platform 7 by means of screw fasteners 49 provided with disc springs 50, chamfered formations 51 and 52 being provided on the facing surfaces of disc 47 and platform 7 respectively for locating the two parts. Disc 45 has a recess in its undersurface which serves to locate the disc 45 within the circular opening of swash plate 47 and defines a bearing surface 53 which slides on the surface 54 of swash plate 47. An external spur gear 55 is formed around the periphery of disc 45 to enable the same to be driven through a worm gear (not shown) by a small DC motor (not shown) which is carried on the platform 7 and has an optical angular encoder associated therewith; this direct drive to the disc 45 enables it to be rotated to any one of a plurality of predetermined desired positions and the function of the cam disc 46, as will now be described, is to enable the position finally taken up by disc 45 to be precisely determined.

On the upper surface of disc 45 there is embedded a circular array of hard balls 56 formed for example of tungsten carbide. The number of balls 56 is divisible by three so that ball positions are symmetrical about 120 degree intervals. Three hardened radially aligned V-blocks 57 are set into the underside of platform 7 and hard dowels 58, which also may be formed of tungsten carbide, are adapted to sit in the V-blocks. The cam disc 46 is formed with three symmetrical cam slots 59 and the dowels 58 ride in these cam slots so as to be radially movable upon rotation of the cam disc 46, a spur gear 60 being provided around part of the cam disc for drivingly engaging a further DC motor carried on the platform 7, via a worm gear, for this purpose. In one limiting position of the cam disc 46, the dowels 58 are retracted radially inwardly so as to be clear of the circular array of balls 56 provided on the disc 45, and as the cam disc 46 is driven towards its opposite limiting position so the dowels 58 are driven radially outwardly until they encounter the balls 56 and force themselves between respective pairs of balls with whatever rotational movement of the disc 45 may be required to enable this to happen.

As the dowels 58, sitting in the 'V' blocks 57 are forced between the balls 56, so they cause disc 45 to lift against the action of the pre-load forces generated by the sprung attachment of swash plate 47 to the underside of platform 7. Swash plate 47 is located with respect to platform 7 by circumferentially chamfered formations 51, 52 which permit radial play when they are not fully seated. The act of lifting off as the dowels 58 are forced home allows the disc 45 to settle in a kinematically repeatable position characterised by the predictable position of the three dowels 58 in their 'V' blocks 57 and the exact positions of the six balls bearing in pairs on the dowels. A set of six axis offsets can then be produced for each index position representing any mechanical errors or inconsistencies in the production of the regular array of balls, dowels and 'V' blocks. These offsets can then be applied to calibrate the exact index positions. In order to force the dowels between the pairs of balls, the cam disc 46 is forced to rotate so that the cam slots 59 move outwards carrying the dowels with them as the fixed 'V' blocks prevent them rotating with the cams. This movement can firstly be rapid as the dowels 58 are moved into position between the balls 56 without encountering any load, this being effected by virtue of the cam slots rapidly extending radially from the disk centre, and subsequently the cam slots extend outwards more slowly in order to improve the gearing when moving the dowels the small additional distance necessary to lift the disc 45 off against its pre-load as the dowels ride up between the pairs of balls and the 'V' blocks. The dowels may feature a small chamfer (not shown) at their outward ends such that their initial impact with the balls is as between two glancing spheres. The cam disc is subsequently rotated in the reverse direction to withdraw the dowels when further indexing is desired. Two PTFE bearing pads (not shown) may advantageously be provided 120 degrees either side of the spur gear bearing on the cam disc 46 where it has no gear teeth to help to maintain true running of the cam disc and support the outside of the cam when reacting against the dowels during rotation. In an alternative arrangement the cam disc may be centred by a ball race acting on its inside circumference. The system as described is sealed and lubricated.

In an alternative configuration the dowel pins may be profiled in cross section to spread the elastically deformed contact point with the balls over a larger area, and to provide for kinematic seating in their tracks thereby to prevent rotation of the dowels in their 'V' blocks. This sophistication reduces the risk of non-repeatable errors caused by lack of consistent roundness in the dowels. The balls themselves could also be of modified shape and need not necessarily be spherical.

As an alternative to the index stage 11 of FIG. 13, a continuously variable precision rotary stage designed to work under computer control could be provided, but if constructed in accordance with conventional principles might be compromised by backlash in the drive system and coarseness in measuring angular offsets which would limit its angular resolution. Rumble and run-out problems usually associated with ball races might compromise the axis of rotation with non-repeatable errors, and a massive and bulky construction might not be avoidable. In the following, however, a means will be described which enables angular precision and smoothness of rotation to be achieved in a lightweight, compact and low cost package. As will be described in the following with reference to FIGS. 14A and 14B, a proposed continuously variable rotary drive system uses two electric motors acting through reduction gear boxes to rotate a large gear attached to the platform. The motors can be driven such that one would be retarded from the other by the backlash that would inevitably rise through the gearboxes and main gear contact, thereby enabling small incremental movements. An accurate measure of degree of rotation is provided at low cost by means of a lightweight running gear which substantially gears up the degree of rotation enabling angular encoder components of medium resolution to be employed and which minimises any backlash by pre-loading the gear tooth interfaces to predictable pressure. A smooth and stiff axis of rotation of the driven gear is provided by utilising two circular disks each formed with a radial succession of circumferential grooves such that the grooves on the two discs run inside each other to establish the required precision alignment of the rotational axis and provide a large disc to disc contact area between which an internally shearing hydro-dynamic lubricant is provided to reduce low speed friction and absorb shock loads and low frequency vibrations.

Figure 14A:
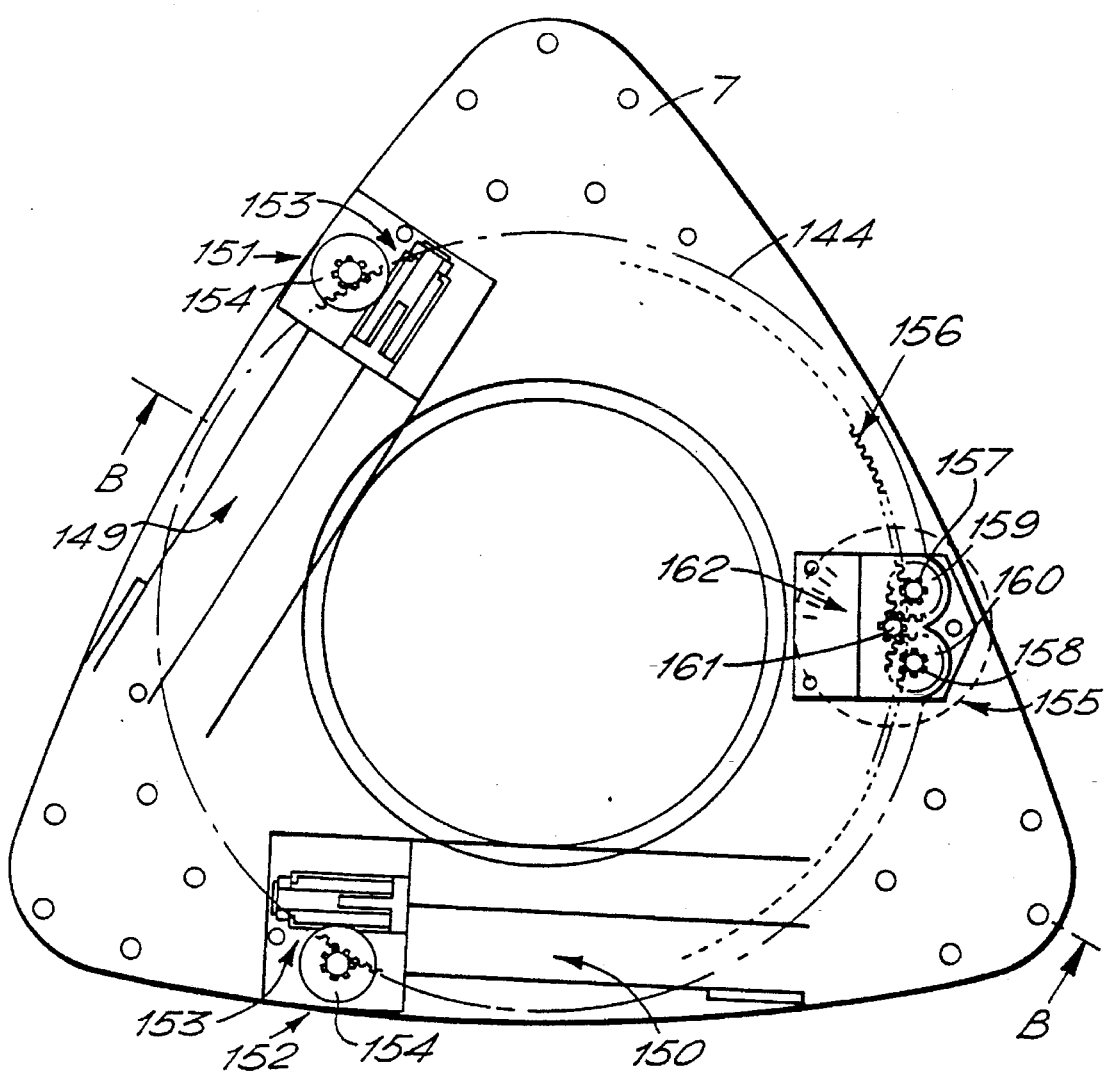
FIGS. 14A and 14B schematically illustrate a continuously variable rotary stage that can be used in place of the indexing stage of FIG. 13.
Figure 14B:
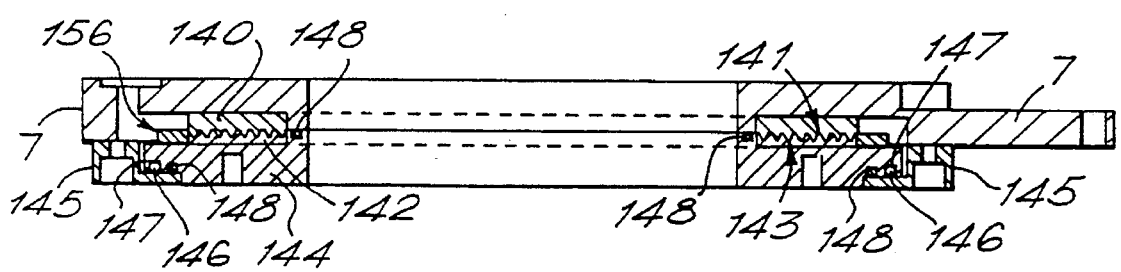

Referring to FIGS. 14A and 14B, which respectively show a schematic underside plan view of the platform 9 with a continuously variable rotary stage attached thereto and a schematic cross-sectional view on the line B . . . B in FIG. 14A, an annular disc 140 is engraved such that a set of radially spaced apart circumferential grooves 141 is formed on one face thereof, the grooves 141 being substantially comprised of faces angled at 60 degrees to the plane of the disc. The disc 140 is retained rigidly to one side of the platform 9. A second annular disc 142 is similarly formed with a set of grooves 143 such that when butted up against the first disc, the two discs mate intimately with the peaks of the grooves on one disc in the troughs of the grooves on the other. The two discs 140 and 142 are lapped together to ensure a high degree of conformance between their two grooved surfaces. The second disc 142 is rigidly attached to a spur gear 144 which forms the basis of the rotating component. The two discs are held together at a predetermined pressure by disc springs (not shown) acting on a flanged external ring 145 forcing the two discs together. The flanged ring 145 bears down on the rotating disc 142 via a large number of small balls 146 retained in a groove 147 formed around the spur gear 144. The groove interface between the two discs is lubricated with a hydro-dynamic lubricant abovementioned and sealed with O-ring seals 148. Two motors 149, 150 mounted on platform 9 act through gear boxes 151, 152 to rotate the spur gear 144. The gear boxes each contain a worm reduction gear 153 and drive the spur gear 144 through a small pinion 154. The motors have individual optical encoders (not shown) associated therewith to enable their degree of rotation to be monitored and the motor control systems are so arranged that the degree of backlash that varies around the stage can be calibrated as a differential offset between the degree of rotation of the two motors, thus establishing an appropriate pre-load in the gearboxes 151, 152 to minimise any backlash.

In an alternative arrangement to that shown in FIG. 14A only one motor could be used to drive the rotary stage. Two gearboxes would be arranged to act on the spur gear 144, one being the main drive gearbox and the other being used to effect a near constant pre-load through both gear trains. The output shafts of the two gearboxes act on the common spur gear which keeps them synchronised. The pre-load gearbox utilises a means such as a circumferentially acting spring to effect a near constant pre-load between the input gear that couples the two gearboxes and the input shaft. Because the two gearboxes rotate in unison, this pre-load is maintained through continuous rotation and acts throughout every gear interface thereby minimising net backlash and enabling the stage to be moved deterministically even for tiny increments.

The abovementioned principle of synchronising the output shafts on a common spur gear, and pre-loading the input shafts together via a circumferentially acting spring is used on a lightweight running gear arrangement 155 that is employed in the arrangement of FIG. 14A to provide an independent accurate measure of rotation. A further spur gear 156 is provided, for example as an integral part of the rotating grooved disc 142, and engages two small pinions 157, 158 which in turn drive respective ones of a pair of small spur gears 159, 160 one of which is circumferentially spring biassed as abovementioned. The two small spur gears 159, 160 in turn drive a further pinion 161 which is coupled to an optical encoder disc 162. The gearbox arrangement 155 is reverse driven from the large spur gear 144 and hence is used to gear up the rotation of the stage to increase the resolution of the measurement of its degree of rotation. It has been found that acting on a 600 tooth spur with a 10 tooth pinion, in turn driving a 50 tooth spur against the final 10 tooth pinion provides a fully reverse driveable and largely backlash free 300:1 gearbox. When fitted with a 500 line encoder providing 2000 radial increments when read in quadrature, the angular movements of the rotary stage can be resolved to 1 part in 600,000 which is about 2 seconds of arc.

Figure 15:
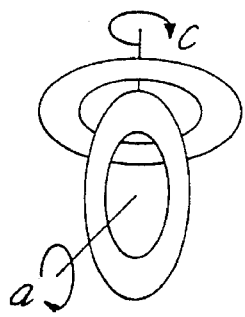
FIGS. 15 and 16 are diagrams useful for explaining the operation of the indexing or continuously variable rotary stage of FIG. 13 and FIGS. 14A and 14B respectively.
Figure 16:
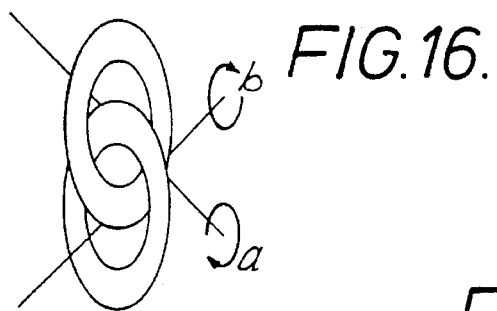

The entire index stage 11 of FIG. 15 is advantageously constructed as a ring, as is the rotary spur gear 144 of the continuously variable rotary stage of FIGS. 14A and 14B, leaving room in the centre of the ring to accommodate other parts of the mechanism required to effect a further movement stage acting in an orthogonally opposed plane. This additional movement stage may be connected to the index disc or spur gear of the previous stage in the manner indicated schematically in FIG. 15 so that the combination of the two stages allows the effector to point in any indexable 'a' and 'c' rotations. The additional movement stage of such an arrangement could use the same kinematic method and cam disc as previously described with reference to FIG. 13 or the same continuously variable arrangement as described with reference to FIGS. 14A and 14B, though the range of movement might be constrained to less than 360 degrees to accommodate the spatial requirements of the revolving effector mechanism. Alternatively, instead of being stacked as an 'a' and 'c' axis, the movement stages could be stacked as an 'a' and 'b' axis as indicated by FIG. 16 in which case the annular shapes of the moving parts allows one to pass through the centre of the other thereby allowing a more compact overall design. In the option of FIG. 16 at least one of the rotating stages would need to incorporate a removable section in order to permit assembly, but this would not be a significant disadvantage as neither axis needs much more than 180 degrees rotation to be fully effective. In the arrangement hereinafter described, movement in the end ('a' or 'b') axis shown in FIG. 15 or 16 is effected by a pivot and powered push rod arrangement as shown diagrammatically in FIG. 17.

Figure 17:
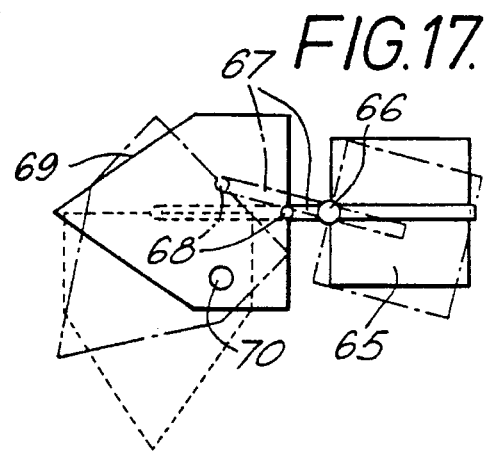
FIG. 17 is a schematic view of a pivotal or tilting stage that is affixed to the rotary indexing stage of FIG. 13 or the continuously variable rotary stage of FIGS. 14A and 14B.

Referring to FIG. 17, an electric motor 65 with an associated optical encoder is pivotally mounted at pivot point 66 to the rigid ring 45 of the index stage 11 illustrated in FIG. 13 or to the spur gear 144 of the continuously variable rotary stage illustrate in FIGS. 14A and 14B. Rotation of the motor 65 is arranged to drive push-rod 67 axially with respect to the motor thereby altering the effective length of the push-rod 67. The end of push-rod 67 is pivotally coupled at pivot point 68 to the casing of effector 69 which itself is pivotally coupled at pivot point 70 to the rigid ring 45 of index stage 11 of FIG. 13 or the spur gear 144 of FIGS. 14A and 14B, so that alteration of the effective length of push-rod 67 serves to change the pivotal orientation of effector 69 with respect to the preceding movement stage. Referring back to FIG. 2, effector 69 in FIG. 17 equates with the effector 13 of FIG. 2, and the powered push-rod arrangement 65, 67 equates with the tilting stage 12 of FIG. 2.

The pivot axis 70 is established to one side of the principal effector axis in order to extend the depth and unobstructed lateral reach of the effector when the axis has translated through a large angle. The pivot points may be constructed using the same mechanical arrangement as is used to pre-load together the bifurcated halves of the ball part of the universal joint shown in FIGS. 8 and 9, one side being rigidly connected to the effector whilst the other is rigidly connected to the previous movement stage. The push rod mechanism 67 can be enabled by using a lead, ball or roller screw attached to the effector 69 with a one axis pivot 68, and retained by nut, ball nut or roller nut to the motor source 65 on a parallel and co-planer one axis pivot 66 acting on the end of the first 'c' stage. The motor source 65 may comprise a hollow cored stepper motor with optical resolver for closed loop control. In rotating the nut, the motor drags the screw through itself, and thus alters the distance between the two pivot points 68 and 66 and hence the effective length of the push rod. As the effector is pivoted so that it can rotate only about the parallel axis 70, any orthogonal offset of this axis to the push rod axis causes the effector to be rotated as the push rod length is varied. This rotation occurs at a gearing stipulated by the angle between the two push rod pivot points and the tilt axis (between 70, 68, and 66). Gearing is reduced as it approaches the optimum 90 degrees. The required push rod length to achieve a given 'a' or 'b' translation angle may be determined trigonometrically.

Figure 18:
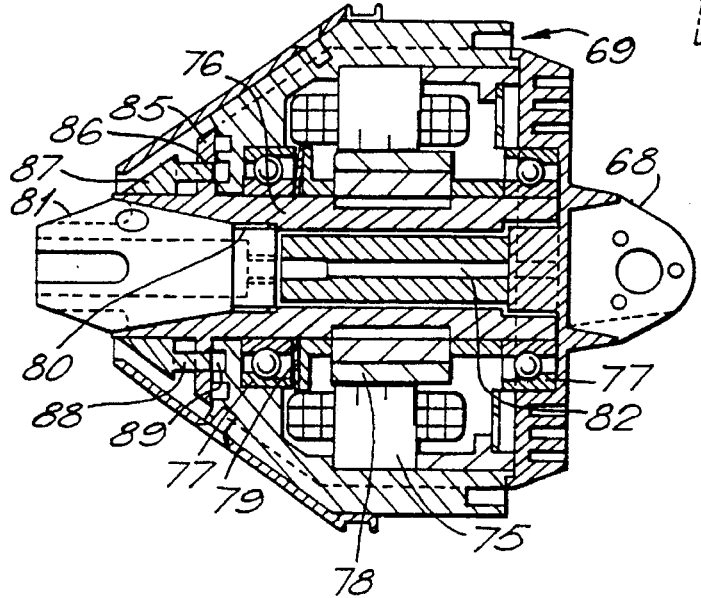
FIG. 18 is a detailed cross-sectional view of a rotary effector forming part of the tilting stage of FIG. 17.
Figure 20:
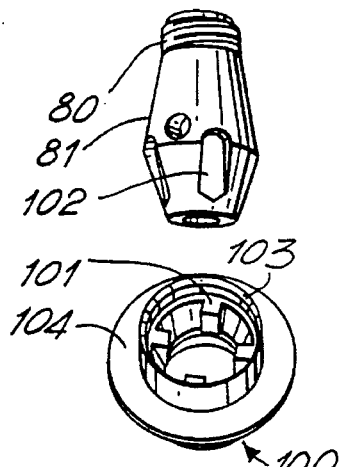
FIGS. 19 and 20 are further views showing the rotary effector of FIG. 18.
Figure 19:
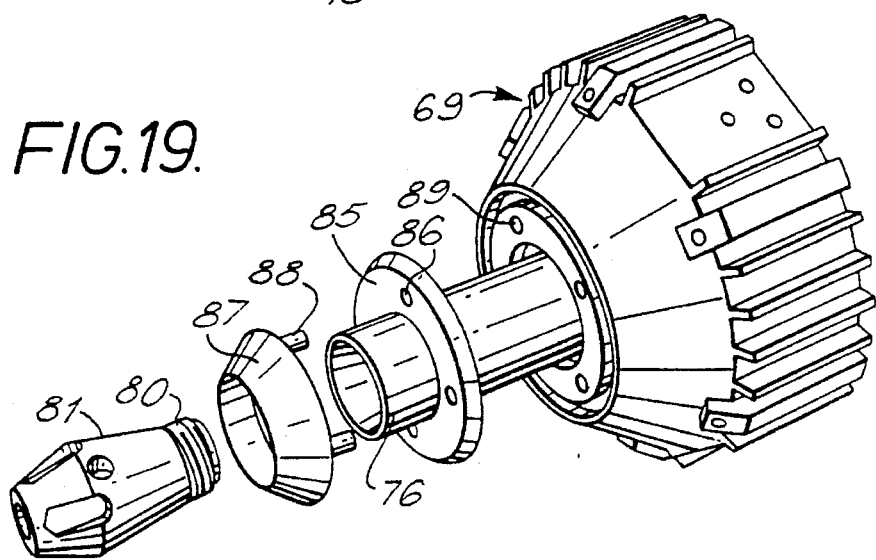

Referring now to FIGS. 18, 19 and 20 the effector 69 of FIG. 17 (referenced 13 in FIG. 2) will now be described. In the described embodiment, the effector 69 is an integrated spindle motor and autochange assembly. In prior art machine tools such assemblies generally comprise a complex collection of many separate parts and mechanisms, designed both to allow the spindle to run true about its rotating axis and to enable various cutting, grinding and polishing parts to be firmly held along this axis in a way that allows them to be automatically exchanged according to the job in hand. As will hereinafter be described, the effector of the mechanism of the present invention has been significantly simplified by the utilization of several novel design concepts. The result is a very compact, yet stiff assembly which is capable of retaining a variety of effector tools whilst not requiring any ancillary powered mechanism to select, grip and release the desired tool. Selection is enabled by moving the machine spindle head to the required tool retained passively in a fixed array location. Tight gripping and release is enabled by using the power of the machine's 'c' axis or platform rotation rather than a further specialised powered mechanism.

As shown in FIG. 18, the effector 69 is built around a brushless DC motor 75 having hollow rotor components which fit directly around a spindle shaft 76. Two deep groove bearings 77 support the shaft 76 on either side of the rotor 78. The rotor 78 is tensioned into the centre of this arrangement by a disc spring 79 which generates a pre-load in the bearings by attempting to push them apart and ensures axial stiffness. The spindle shaft 76 is hollow, with one end additionally cut away at an internal taper and with a screw thread 80 formed into a parallel extension of this taper. The taper is designed to accommodate a chuck component 81 which in turn can rigidly retain a variety of forming tools using an industry standard flatted shank gripping method. The hollow centre of the spindle shaft 76 can additionally accommodate a strut protruding from the back of the motor casing. This strut features at its forward end 82 the female part of an electrical connector of a type which is insensitive to minor rotation when connected, such as a jack plug or coaxial connector. This in turn enables an electrical connection to be made with an adapted chuck component featuring the appropriate male end of the connector protruding from its rear end. Such an adapted chuck could accommodate a touch probe for metrology purposes or any other device where power and/or signals need to be communicated to or from the effector.

The spindle shaft 76 also features a means to lock its rotation with respect to the motor casing as additionally shown in FIG. 19, such means being useful for attaching and detaching a chuck component 81 from the motor spindle 76. The spindle shaft 76 has a radial flange 85 at its forward or chuck end with a number of holes 86 formed around it. A ring 87 with a similar array of protruding pins 88 can slide along the shaft, the pins 88 being adapted to pass through the holes 86 in the flange 85. The ring 87 is retained close to the flange 85 with its pins retained in this way by an elastomeric washer that can be compressed. Behind the flange 85 is the motor casing, which features holes or slots 89 again in the same array as the pins 88 on the ring 87. When a chuck component 81 needs to be exchanged, the effector 69 is pressed against a spanner 100 shown in FIG. 20 which is capable of gripping the chuck by virtue of formations 101 within the spanner engaging grooves 102 on the outside of the chuck. When employed for tightening or releasing the chuck, the pressure on the ring 87 shown in FIG. 19 that is brought about by pressing it against a similar flange 103 on the fixed spanner 100 causes it to compress the elastomeric washer behind it, which in turn forces the pins 88 on the ring 87 through the holes 86 in the radial flange 85 and into the mating holes 89 on the motor casing. This effectively prevents the spindle shaft from turning with respect to the motor casing. This locking arrangement is useful to un-jam a chuck component 81 which is tightly screwed into the spindle, since the superior torque available to effect 'c' rotation of the effector assembly can be brought to bear upon the chuck component rather than relying on the torque of the spindle motor alone, the spindle motor being principally designed for high rotational speeds. Once the chuck component thread has been un-jammed, the spanner can be withdrawn sufficiently to relax the pressure on the ring, causing the pins to be withdrawn from the motor casing by the expansion of the elastomeric washer; the spanner however retains its fit in the grooves of the chuck and thus prevents the chuck from rotating. The spindle motor can then be employed to unscrew the chuck in synchronism with its slow withdrawal according to the lead on the chuck retaining screw thread. This procedure can be employed in reverse order to retain a chuck tightly to the spindle.

Figure 21:
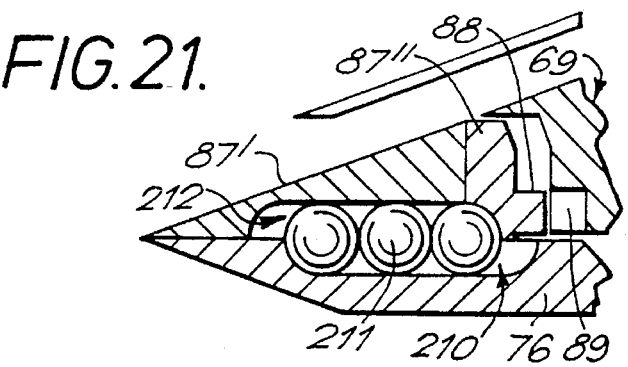
FIG. 21 illustrates a modification of the rotary effector of FIG. 19.

An array of such flanged spanners 100 can be used as an auto-change tool rack. They can additionally include magnets to retain the chucks (if made out of ferro-magnetic material) thus enabling the provision of racks at various angles such as a vertical array for example. A means can also be provided to confirm whether a given rack tool location is occupied, such means comprising for example an optical sensor or a hall effect sensor which reacts to the induced magnetic field in the chuck once gripped by the retaining magnet in the spanner unit. In order to calibrate the spanner positions with respect to the rotational angle necessary to locate the grooves in the 'parked' chuckspindle unit, the spanners as shown in FIG. 20 each have an additional radial flange 104 which can be sandwiched between the frame of the tool rack and a counter plate which can be tightened down, thus preventing rotation of the spanners once they have been set to the correct mating degree of rotation.

in an alternative arrangement, the means to lock the rotation of the spindle with respect to the motor body is effected in a way which reduces the risk of radial misalignment and hence the possibility of the sub-system generating vibrations, particularly when the motor is a high speed motor. As shown in FIG. 21, which is a part sectional view wherein the same reference numerals as are used in FIG. 19 designate the same or similar parts, a series of axial grooves 210 (only one of which is shown) are machined into the motor shaft 76 at 60 degree intervals around the shaft circumference. The grooves alternately allow a small compression spring (not shown) to be inserted to approximately half its width, or allow a number of balls 211 to roll along the grooves at a depth approximating to their radius, the grooves accommodating the balls preferably having a cusped conforming cross-sectional profile like a Gothic arch. The slider ring 87 is produced in two parts 87' and 87" which are axially retained with screw fasteners. Each part is formed with parts of grooves 212 which register circumferentially with the grooves 210 provided in the spindle shaft. The grooves which retain the balls are however axially offset such that when fitted and in its unlocked position, non-overlapping space is left in the groove facing outside on the ring and inside on the shaft, allowing for over-run of the balls retained in the cavities defined by registering grooves 210, 212 when the slider is moved inwards. The inside facing part 87" of the ring also has several pins 88 which extend inwards and serve to lock into similar cavities 89 provided in the motor body 69 when the slider ring is moved inwardly, thus preventing relative rotation between the ring 87 and the motor body.

When assembling the sub-system shown in FIG. 21, the inner ring 87" is first slid onto the shaft 76. The compression springs are then inserted into their grooves and a number of balls retained with grease in their respective grooves, the number of balls required when stacked together being in total shorter in length than the groove by the degree of travel required to lock the system, this degree of travel being in turn equal to the non overlapping space between the grooves in the shaft 76 and in the slider 87. The outer ring 87' is then slid on and retained to the inner ring 87" by means of screw fasteners. The process compresses the springs slightly and traps the balls in the cavities defined by registering grooves 210, 212. The slider 87 can now move inwards along the shaft 76 with compression of the springs until the locking pins 88 have extended fully into the cavities 89 so that the shaft 76 is effectively circumferentially locked to the motor housing 69, the balls 211 in their respective grooves preventing any relative rotation between the ring 87 and the shaft 76. When the inward pressure is relaxed, the compression springs cause the ring 87 to slide outwards until the balls 211 trapped in the overlapping cavities prevent further movement. The balls are gauged slightly oversize such that the resulting pre-load will eliminate any radial slack. After initial assembly the whole arrangement can be dynamically balanced.

Figure 22:
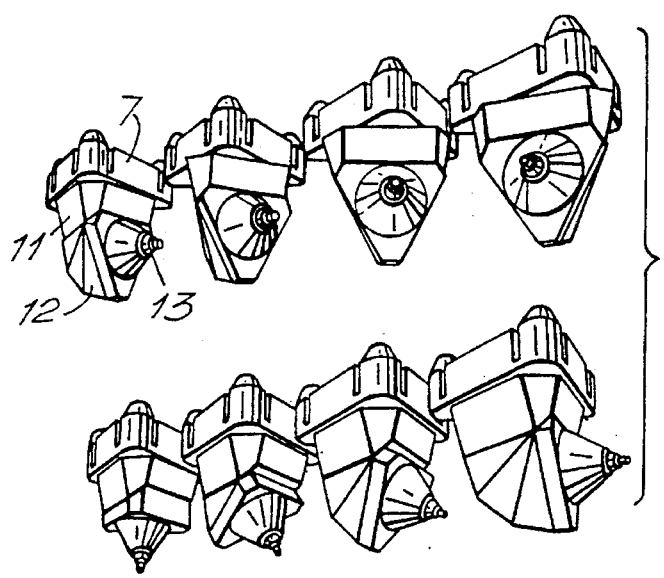
FIG. 22 illustrates the combined action of the rotary and tilting stages and of the rotary effector coupled thereto.

FIG. 22 provides multiple views which illustrate the nature of the movements that are available by virtue of the provision of the rotary indexing stage of FIG. 13 or the continuously variable rotary stage of FIGS. 14A and 14B coupled to the underside of platform 7, and the following pivot and powered push-rod stage 12 (FIG. 17) which mounts the effector 13. The pivot and powered push-rod stage 12 as shown in FIG. 22 is enclosed within a flexible protective boot and this accounts for the lack of detail shown in FIG. 22. The multiple views shown in FIG. 22 are of course not exhaustive and many other positions of the respective parts relative to each other are available.

Figure 23:
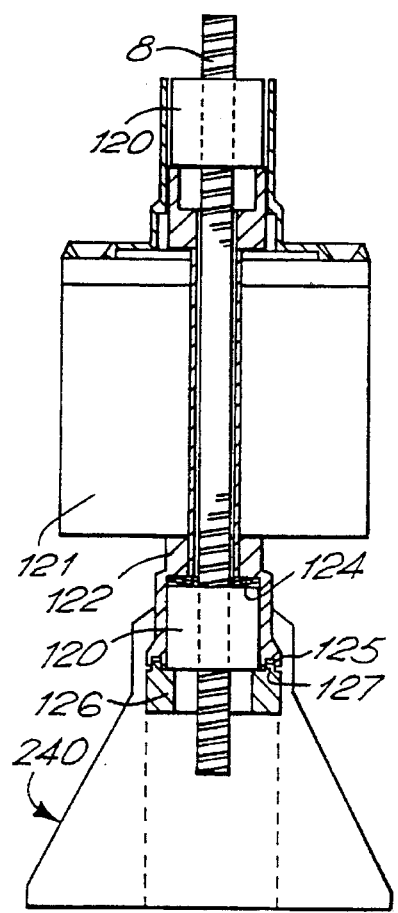
FIGS. 23, 24 and 25 illustrate the construction and arrangement of the leg drive motors.
Figure 24:
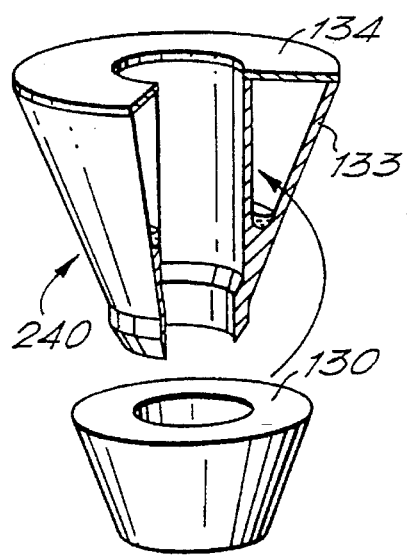
Figure 25:
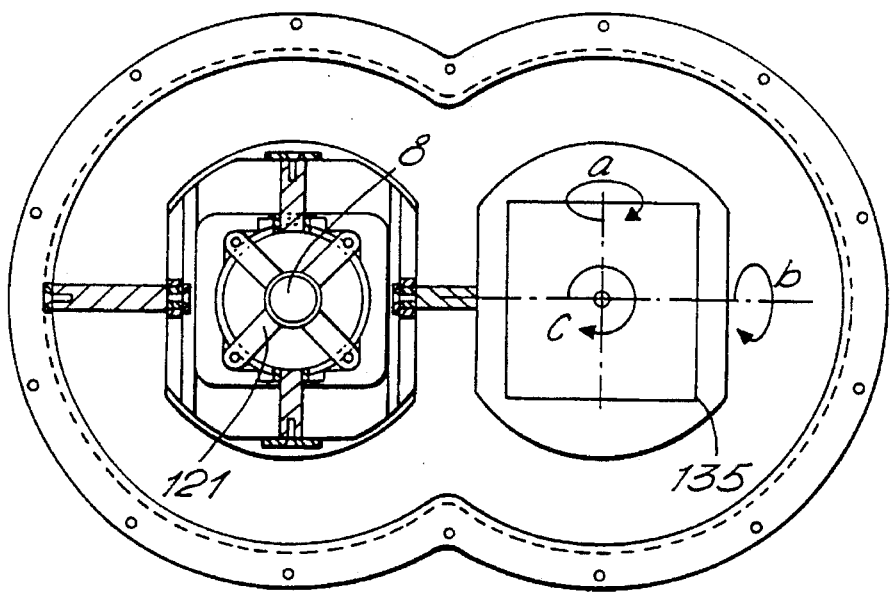

Referring now to FIGS. 23, 24 and 25, these illustrate the leg drive arrangement in the embodiment of the invention herein described. The legs 8 are provided with screw threads profiled for ball nuts, although lead or roller nuts/crew combinations could be alternatively employed. The ball nuts are driven by stepper motors and maintain a near constant pivot point, dragging the screw through themselves to alter the effective leg length. Rather than risk fidelity losses by driving the ball nuts indirectly via a belt or gear, the ball nuts are driven directly by the motor shaft which, being hollow, allows the leg to pass through its centre as the ball nuts are rotated. Referring to FIG. 22, ball nuts 120 are retained on both sides of the motor 121. An arrangement maintains a pre-load pressure between the two ball nuts, causing them to ride stiffly in opposite sides of their thread groove. The pre-load can act over a small distance, absorbing errors caused by lead pitch variation between the two nuts, wearing in of the screws/nuts and thermal expansion. The arrangement in question comprises a nut-retaining collet 122 which can be tightened to grip the hollow shaft of motor 121. The collet 122 is a hollow barrel with a disc spring 124 in its base and several guide holes 125 at its end. The ball nut is fitted with a collar 126 from which several guide pins 127 extend. The nut 120 is placed into the barrel such that the guide pins 127 on its collar mate with their equivalent holes in the collet 122, and the nut bears down on the disk spring 124 in the barrel base. Because the pins 127 prevent relative rotation between nut 120 and barrel 122, as the collet is rotated during fitting, but not allowed to move axially, the nut 120 is driven into the barrel 122 thereby compressing the disk spring 124. Locking the collet off on the motor shaft preserves the selected pre-load pressure acting on the thread.

The collets 122 in the above-described arrangement may accommodate an angular optical encoder disk and furthermore may each carry an inertial mass vibration damper 240 as shown in FIG. 24. Referring to FIG. 24 the damper features a dense loose inertial mass 130 suspended by a hydro-dynamic lubricant in a lightweight hollow cored chamber 133 sealed with a tight fitting lid 134. Motor impulses as generated by a stepper motor are averaged out to near constant angular velocity by the inertial mass retarding during rapid acceleration and advancing during braking within its chamber. The potential energy is dissipated as kinetic in the heating of the boundary lubricant, which in turn is radiated and conducted away. The result is a significant improvement in smooth running and in particular the avoidance of low frequency resonance.

As shown most clearly in FIG. 25, the motor drive unit 121 of FIG. 23 is suspended in a gimbal cradle 135 with two orthogonal ('a' and 'b') pivot axis passing through a common point. Also passing through this point is the central axis of the respective leg 8 allowing in turn the leg to pivot through both 'a' and 'b' axes. The pivot points may be constructed using the mechanical method hereinbefore described and employed to retain under pre-load the two halves of the bifurcated ball shown in FIGS. 10 and 11 of the universal joints 9.

In an alternative leg drive arrangement shown in FIGS. 26A to 26D, the gimbal cradle of FIG. 25 is replaced by a spherical ball and an accommodating annular socket, the ball enclosing a hollow electric motor and ball nut system allowing a leg drive ballscrew to pass through it, and the socket incorporating a means to prevent counter rotation of the ball which would otherwise result from the torque caused by the lead angle and frictional losses in the ball screw when it rotates. This arrangement had advantages over a gimbal, because with fewer separate mechanical interfaces it can be made stiffer and more compact. Additionally the arrangement is not compromised by the effects of thermal expansion which could cause a gimbal system to lose its unambiguous focal point. The spherical ball is cut away internally to accommodate the stator and other motor components, the bearings used to support the hollow drive shaft, encoder components used to resolve the degree of rotation of the drive shaft, and a means of introducing electrical connections and optionally a motor cooling system. The sphere comprises at least two parts such that it may be split open to gain access to the internal components, and is cut away at its poles to enable the ballscrew to pass through it. The sphere additionally features a longitudinal groove around at least one of its external sides, such that the groove subtends a greater angle to the focal point of the sphere than the expected extent of rotation of the sphere within its socket. A pin and slider system retained in the annular socket locates into this groove, constraining the resulting degrees of freedom of movement of the ball in the socket to two axis of tilt but no rotation. The annular socket incorporates a means by which it can be separated in order to introduce the sphere into its centre. In the illustrated arrangement this is an equatorial division of the socket into two halves which can be pre-loaded together so as to enclose the ball under a predetermined pressure. The pin system is retained in one side of the socket such that the pin lies in an axis intersecting the focus of the sphere and locates in the groove formed in the external surface of the sphere such that it may slide or otherwise be displaced along the groove, but may not pass outside of its locus.

Figure 26A:
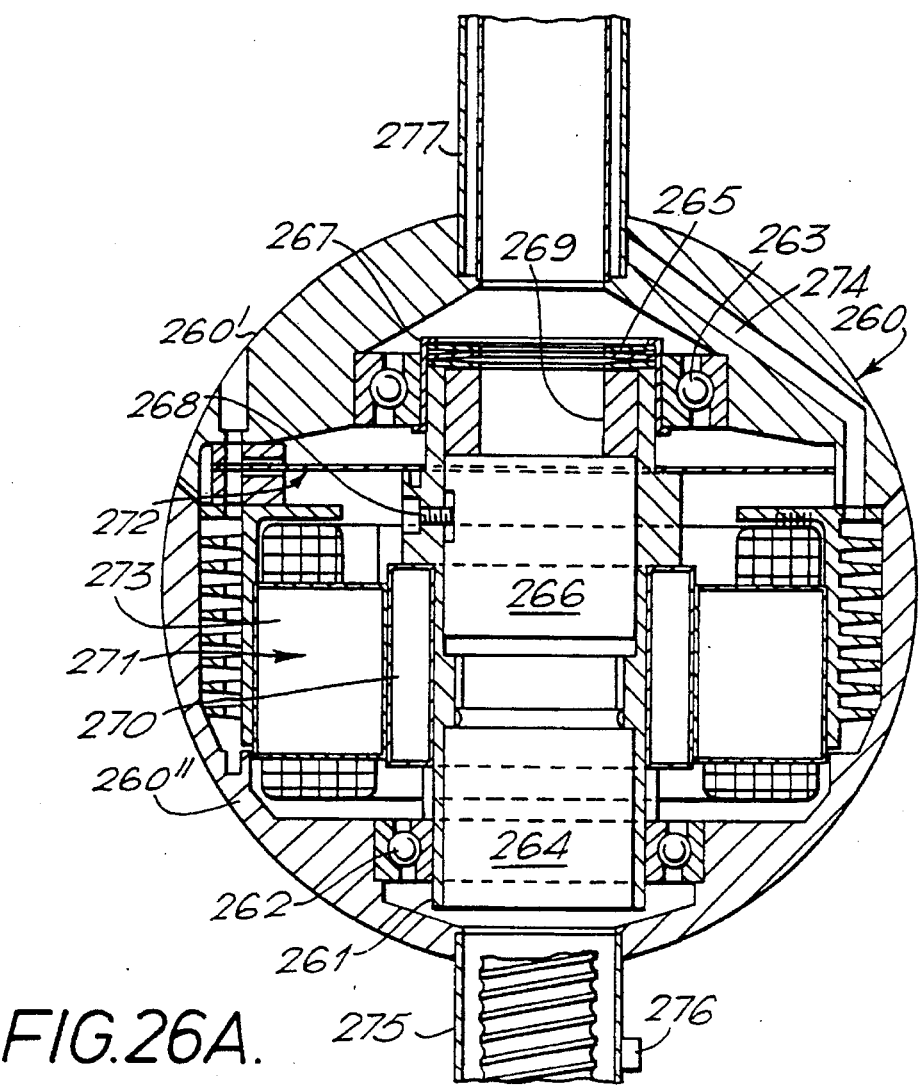
FIGS. 26A to 26D illustrate an alternative leg drive motor arrangement.
Figure 26B:
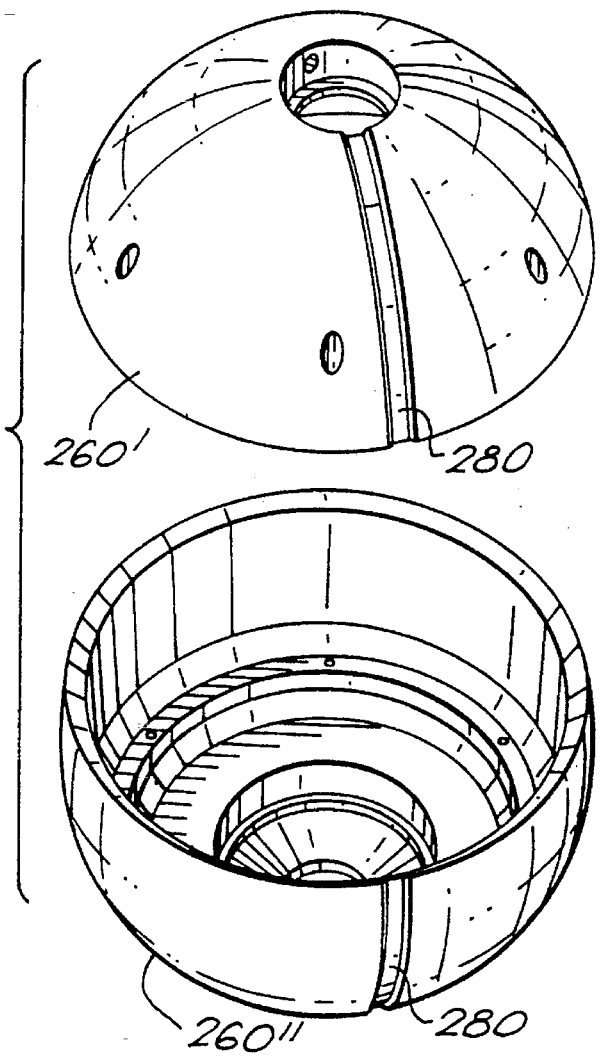
Figure 26C:
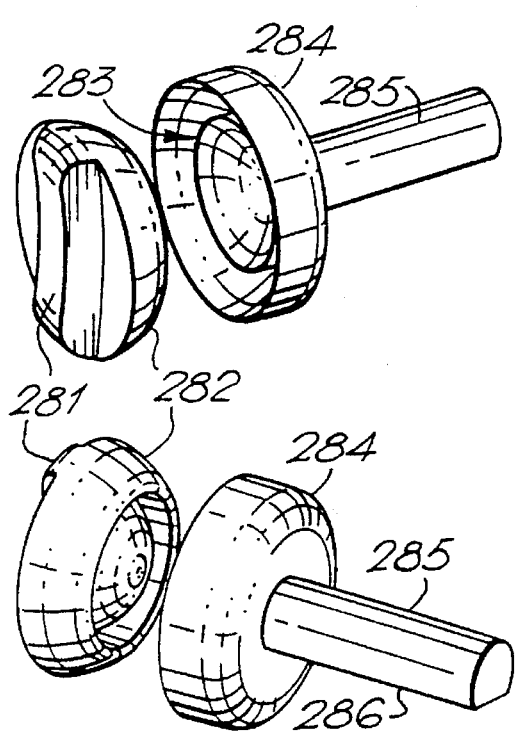
Figure 26D:
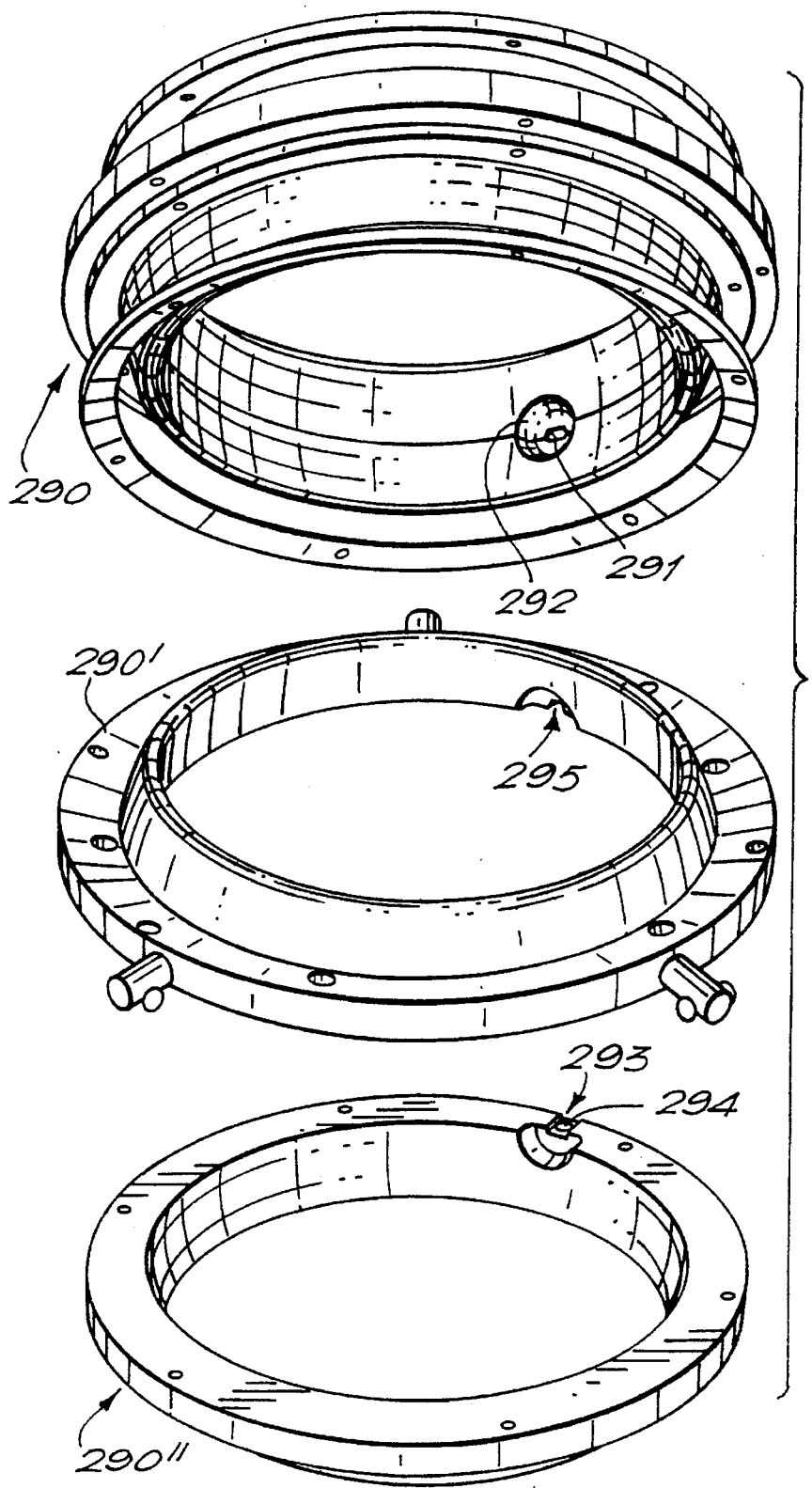

Referring to FIGS. 26A to 26D wherein FIG. 26A is a schematic cross-sectional view of the spherical ball showing the enclosed leg drive motor, FIG. 26B is a perspective showing of the two parts of the ball, FIG. 26C is a perspective showing from two different directions of the pin and slider system, and FIG. 26D is a perspective showing of the accommodating annular socket both in assembled and in dissembled condition, the sphere 260 holds the drive shaft 261 by means of bearings 262, 263 retained in each of its two halves, these bearings being held under pressure by virtue of their inner races being constrained by the length of the drive shaft. A ball nut 204 is rigidly retained on one side of the shaft with a screw thread. A disc spring arrangement 265 allows the drive shaft 261 to adjust its effective length such that the resulting pre-load on the bearings can be pre-set. The disc springs 265 apply their pressure between the inner race of the bearings 263 and a second ball nut 266 via a flanged bush 267. The nut 266 is constrained from rotating with respect to the drive shaft 261 by a pin and groove system 268, and is held in a common axis with the screw by a piston 269 built into the drive shaft. The pressure of the pre-load is thus passed on to the ball nut and screw interface, ensuring in turn a largely equal pre-load between the two ball nuts as between the two bearings. The drive shaft 261 additionally retains the hollow rotor component 270 of a frameless solid state commutated DC servo motor 271, and an optical encoder wheel 272.

The motor stator 273 features a jacket with a two start deep thread on its outside face. When the rotor is tightened into the ball housing by bolting both ball halves together, these channels become enclosed. An air or fluid coolant may be introduced via passageways 274 in the ball housing. The coolant enters one of the thread starts, and circulates around the jacket until it reaches the end of the jacket. Here both starts are allowed to connect in an annular cavity such that the only escape for the coolant is to return spiralling up the second thread start. At its end it is allowed to exit the sphere via further passageways. These passageways are also used to effect electrical connections with the motor, encoder and other transducers. On one of the poles of the sphere, a tubular strut 275 is used to offset a hall effect transducer 276 which co-operates with a magnet in the driven leg to act as a limit switch, and serves also to retain a system of protective covers for both the sphere and the leg drive ballscrew.

On the other side of the sphere a hollow tubular strut 277 is used again to retain protective covers, but additionally to enable coolant flow and electrical connections to be effected. These struts are of minimum practical diameter in order not to overly constrain the degree of tilt that the sphere can achieve before the struts come up against the lip of the annular socket.

As shown in FIG. 26B, the two parts 260' and 260" of the sphere 260 are formed with a partial equatorial groove 280. FIG. 26C shows a pin and slider system comprising a slider 281 formed on one face of a generally hemispherical member 282 which is adapted to fit into a socket 283 formed in a member 284 having a pin 285 extending from the opposite side thereof. FIG. 26C shows the annular socket 290 which accommodates the sphere 260, the socket being formed as abovementioned in two parts 290' and 290' which bolt together to capture the sphere. The pin 285 of the pin and slider system shown in FIG. 26C is adapted to be received within an opening 291 that extends through the wall thickness of the socket 290 from a recess 292 that is provided in the inner surface of the socket to accommodate the member 284 from which the pin 285 extends. The pin 285 is flatted at 286 and a flatted groove 293 is formed on the rim of the lower part 290" of the annular socket 290, a recess 294 in the flatted groove 293 serving to accommodate a spring member. On the facing rim of the upper part 290' of the socket there is formed a V-groove 295 and the curved part of the pin 285 opposite to the flat 286 registers with this V-groove under loading from the spring in recess 294. A disc spring (not shown) is fitted between the rear surface of the member 284 from which the pin 285 extends and the innermost (rear) surface of the recess 292 formed in the socket 290. The rear surface of the generally hemipherical member 282 which carries the slider 281 is formed as two equal radius, part spherical surfaces recessed one within the other and the inner surface of the socket 283 is complementarily formed; this arrangement provides the member 282 with the requisite range of movement within the socket 283 whilst reducing the combined size of the components 282 and 284. The partial equatorial groove 280 has its side walls inclined at an angle of 60 degrees to the base of the groove such that the slider 281 on the end of the pin 285 is not unduly subject to forces such as to cause it to be expelled out of the groove under pressure orthogonal to the groove. The pin 285 is constrained to move along only one axis by its engagement with the 'V' groove built into one half of the annular socket 290, one disc spring applying pressure to force the pin into its 'V' block and another forcing the slider 281 into the groove 280 as the arrangement is assembled. The slider has the mating surface of rotation to the groove so as to maximise the contact area of the lip faces and as described is retained by a socket system such that it may rotate with respect to the pin and can self align to promote precise seating of the slider in its groove. The socket system comprises a mating profile equivalent to several annular ball and socket sections sharing a common focal point about which it can subsequently rotate, this configuration minimizing the depth of the components.

The slider 281 could alternatively be constituted by a recirculating ball system, such that the balls run between an appropriate groove on the sphere and a rotating component attached to the pin 285. The annular socket parts 290' and 290' have provision for two rings to be bolted under disc spring based pre-load on either side of the socket mounting flange. These rings are used to retain an elastomeric protective cover and clamp the two halves of the annular socket together around the ball under predictable pressure. The entire sub-assembly can thus be hermetically sealed to prevent the ingress of dirt. The protective cover for the ball screw on its free end may be connected to a piston sliding inside the ballscrew. The piston is extended when the ballscrew is fully retracted to allow for the compressed length of the protective cover whilst permitting the maximum extension of the ballscrew on its tethered end. The leg drive ball screws may advantageously be hollow, allowing damping masses to be suspended internally with friction absorbing interfaces such as may be provided by an internally shearing lubricant to reduce low frequency resonances.

The arrangement of FIG. 14B is very successful at providing controlled rotation, but can only work effectively where a rotating component is retained from one side only because of the importance of the two discs freely settling together without any alignment ambiguities. An extension of the principle of the FIG. 14B arrangement as hereinbelow described provides a means whereby the discs of FIG. 14B could be given self aligning properties, thereby enabling them to be used on either end of an axis of rotation. In contrast to the arrangement of FIG. 14B where the grooves are similar and symmetrical, the further proposal is that the grooves are not all similar, but form short sections of arc similarly to the grooves on the components shown in FIG. 26C whose centre is common to all grooves and which lies along the axis of rotation. The combined effect is analagous to a Fresnel lens. As before, one disc is produced as the negative impression of the second, such that they fit together utilising these short sections of arc as their bearing surfaces. A small displacement is retained at the crest of each arc before the start of the mating arc to allow relative movement of both components about their common arc section origin. This displacement will optimally increase with the distance from the axis of rotation allowing for the settling and self alignment of both components. Even when settled asymmetrically, they will still rotate smoothly. If the focus of the arc sections lies near the plane of the array of grooves, the emphasis will be on the radial loading capability, if not then the emphasis will be on axial loading. Larger displacements of successive grooves permit a higher degree of misalignment at the expense of reducing the contact area and hence loading. In both of these ways the operating characteristics can be tuned.

The spherical socket 290 as illustrated in FIG. 26C is adapted to be bolted into the bulkhead which supports the leg drive motors of the apparatus, as is the gimbal arrangement shown in FIG. 25. However, with such a bolted construction it is difficult to define the precise positional relationships between all the nodes in the 6-axis geometry defined by the suspension legs, so that absolute positional accuracy can be maintained only with difficulty throughout the mechanism's working volume. Rather than to rely on the precision of manufacture, it is desirable to accurately measure expected variances and correct for them when calculating the set of leg lengths. In the following a method and set of kinematic jigging is proposed which enables this to be done to great precision and, furthermore, in a manner which allows alternative parts to be freely interchanged without the need for further calibration measurements. A similar arrangement could also be utilized for mounting the universal magnetic joints, which couple the fixed ends of the support legs to the machine platform, but the following description will concentrate on the mounting of the leg drive means. The universal joint of FIG. 25 or the sphere drive of FIG. 26 that is used to pivot the driven end of each support leg needs to be retained in a sub-frame which establishes its relative position in relation to the other leg drives. If removed for service or replaced, the focal point of the drive must remain known to great precision. The first requirement is thus a means by which the retained position of each leg drive means will be consistent. The proposal is to support each leg drive means using a so-called 'Type 2 Kelvin Clamp' comprising three struts angularly spaced apart at 120 degrees to each other in the same plane and three mating 'saddles' each comprising a pair of balls in a fixed arrangement. Such a support means has only one possible settling point in 6-axis space. Considering the leg drive means of FIG. 26 as an example, the three struts are provided on the annular socket 290' retaining the drive sphere 260. These struts are settled in mating 'saddles' joined onto a mounting flange which is fixed into the subframe of the machine. Six of these mounting flanges thus provide seating for the six sphere drive units. A means is provided to apply a closing pressure between the struts and saddles which still permits small relative movements, such as a fastener through the strut tightened against disc springs. As well as providing for repeatable positioning, this arrangement has other advantages, namely if the sphere drive expands relative to the mounting flanges, then the struts will slide outwards in their saddles largely retaining a consistent focal point, and if the curved surfaces comprising either side of a saddle are electrically insulated from each other, then any forced movement of the sphere drive exceeding the retaining pressure of the disc springs will cause one or more struts to break the electrical short they were effecting between the saddle sides thereby enabling mechanical overload to be detected.

Figure 27A:
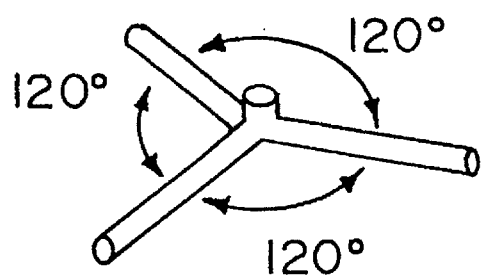
FIGS. 27A and 27B illustrate two jigs of an alternate clamping system.
Figure 27B:
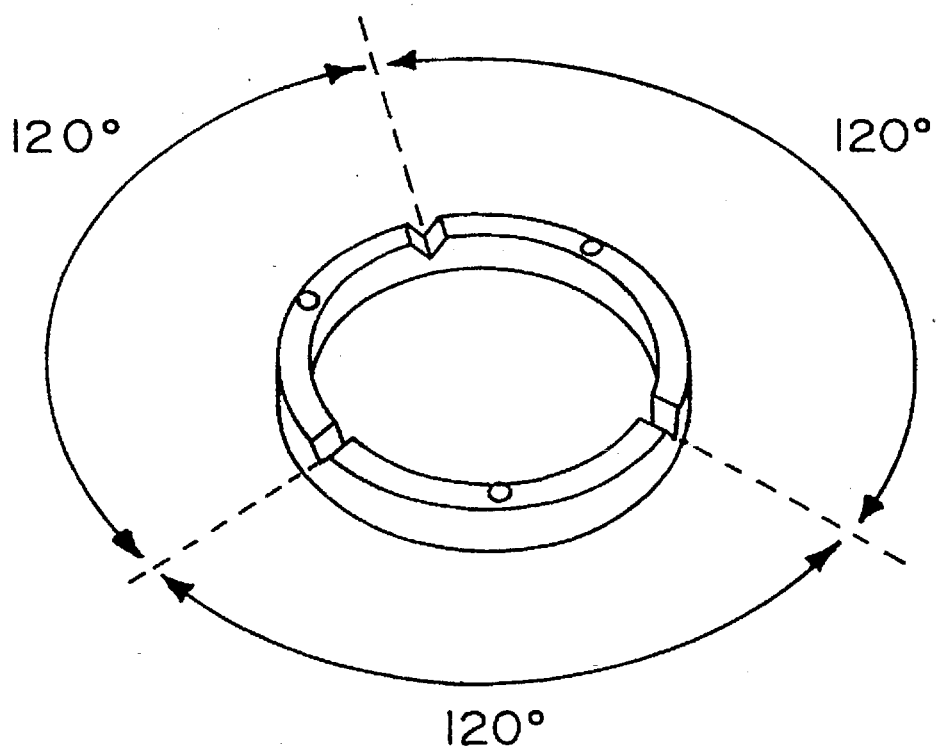

The proposal furthermore is that two jigs (shown in FIGS. 27A and 27B) are constructed which fit together in much the same way as the sphere drive unit and its annular mounting flange. One jig has three struts similar to the sphere drive unit, but instead of the drive unit there is a small high precision sphere mounted at the centre of the arrangement. The other jig has three saddles similar to the mounting flange, but in addition has three small high precision spheres mounted around the ring such that even with the sphere drive fitted the probe of a 3 axis co-ordinate measuring machine (CMM) can still gain access to the small spheres. The calibration procedure can then proceed as follows. The machine subframe with the six mounting flanges firmly fitted is taken to a CMM. The strut jig is placed in the first flange such that each numbered strut fits into a similarly numbered saddle. The position of the small sphere is then measured. The process is repeated by moving the jig and re-measuring, until the relative positions of each spheres successive location is known on a common coordinate system. The strut jig is then placed in the flange jig in a repeatable numbered orientation. The relative positions of each of the three small spheres on the flange jig and the small central sphere on the strut jig are accurately measured on the CMM. Each sphere drive unit in turn is then placed into the flange jig in a numbered orientation. The centre of the sphere is then measured on the CMM relative to the three small spheres on the jig. An offset vector can then be calculated representing the relative position of the drive sphere from the sphere on strut jig. Because all of the strut jig locations on the subframe are known, the positions of the drive spheres can be deducted by calculating in the offset vector. This procedure can be equally applied to the other end of the leg, where the bifurcated ball joint position is measured with respect to a similarly mating kinematic jig, and the jig location measured to kinematicaly mating locations on the mechanism platform which will retain these joints. Each leg mechanism will thus have two offset vectors associated with it representing the variance of the actual unit focal points from those of the standard jig. These values could be considered as part of the components 'personally' along with other specific data such as lead pitch error variation along the length of the ballscrews where these are used as the legs. This 'personality' would advantageously be recorded on digital media such as ROM which could be accessed by the control system. Any replacement parts would thus automatically update the overall calculation parameters with the new precise linkage focal points and other component-specific self knowledge.

Having thus described the active working parts of the subject machine, attention is refocussed in the following upon its surrounding environment as defined by the cabinet shown in FIGS. 1 and 3. In traditional machine tools a massive chassis maintains stiffness between the cutter and the workpiece and any cabinet that is additionally retained to this chassis performs substantially only cosmetic and convenience features. In the arrangement according to the present invention, however, the machine cabinet is an integral part of the machine geometry and performs the functions of a chassis much as rigidity is provided by the body of a monocoque car. Additionally, in the present embodiment, the cabinet is arranged to enable the machine to be disassembled into smaller and more manageable components, as well as providing other features offering enhanced convenience. As shown in FIG. 1 and as previously described, the machine has upper and lower compartments 2 and 4. The upper compartment houses the robotic machine mechanism, allowing the arm and effector arrangement to be suspended into the work space below. The lower compartment situated below the work space houses the associated equipment. It is divided into a clean section where the electronics and blower is located, and a further section where the swarf collection system and vacuum pump is located. Joining the two compartments are four removable pillars 140 which, considered in section, are triangular with a right angled vertex which forms a respective one of the four corners of the machine. The pillars 140 are retained rigidly into cut away corners of the upper and lower cabinet compartments. Removable windows 141 are hinged from the pillars 140 and seal on their other three sides to the upper compartment, adjacent pillar and lower compartment respectively. In determining the design of a machine tool monocoque cabinet, it is desirable to minimise low frequency resonances which are of a sufficient magnitude to affect the spatial relationship between effector and workpiece. This can be achieved by either increasing the stiffness or decreasing the mass of the constituent parts. It has been determined that a material with a superior stiffness to mass ratio is a laminate with an expanded honeycomb core and rigid facing skins. Aluminium is a suitable material for both core and skins. It can be cut by computer controlled routing, and by removing strips of the inside skin it can be successfully folded leaving a pleasing external radius similar to the laminates thickness. Laminates of different thicknesses have thus been employed for the bulk of the cabinet construction. The panel into which the mechanism is retained and the panel onto which the workpiece is retained are both of a thicker hence stiffer laminate construction (in this case 50 mm), the floor pan which retains the associated equipment is of a medium thickness (in this case 25 mm) and the panelwork and triangular pillars are of a lighter construction (in this case 13 mm). By virtue of the use of triangular section pillars well retained by top and bottom compartments, extra stiff panels for mechanism and workpiece support, and the use of high stiffness to mass honeycomb laminates, an exceptionally rigid machine cabinet with mini- mal low frequency resonances is obtained which additionally offers the convenience of light weight as compared to traditional cast iron or similar heavy metal constructions.

Integrated into the cabinet and machine design is a means of cooling system components and collecting swarf and dust resulting from machining operations. As shown in FIG. 1, the power for this system is a side channel blower 5 situated in the lower cabinet compartment. The pillars 140 are used to transport the high pressure air to the upper compartment where vents 142 are situated so as to force the air over electronic driver devices employed to generate the power for the mechanism, thereby cooling them. The upper compartment 2 is otherwise sealed, with the exception of openings where the legs 8 of the mechanism are installed and where the motors 10 which drive the legs are situated. Each such opening is framed by an airtight boot which extends down the length of the respective leg. The high pressure air is thus forced to flow past the drive motors 10 which are consequently cooled, and down each of the legs 8. The legs and their surrounding boots join the head unit of the mechanism which in turn becomes pressurised. The air is then forced to flow between an external jacket and cooling fins on the spindle motor case of the effector thereby cooling it. The only escape from the head unit is then to flow past the rotating spindle system which may advantageously include small vanes which whip the air into a vortex, generating a low local pressure which helps to retain and direct the airflow tightly around the cutting tool thereby cooling it. The swarf which is released from the workpiece by the action of the cutting tool is then blown clear into the working volume of the cabinet which then in turn assumes a higher than atmospheric pressure. The only escape for the swarf laden air is via holes 144 in the top surface of the lower compartment from where the swarf laden air is collected to a common hose and expelled into a porous dust bag 6. The warm air with the bulk of its swarf filtered out by the bag is then allowed to escape to atmospheric pressure and the outside of the cabinet, The rigid retention of a workpiece can be a problem especially where high loads are acting on it by virtue of machining operations and thin walls or fragile materials prevent sufficient classical vice action gripping. In many situations there is no good alternative to holding the perhaps partly machined object over a large part of its surface area against a tailored surface by the use of an air pressure differential between the top and bottom surfaces of the object. In a traditional vacuum hold down system a series of holes in a rigid surface underneath the object helps to distribute the low pressure generated by a vacuum pump whose inlet is connected to these holes, often by the use of a common low pressure reservoir such as a sealed compartment. A limitation of this arrangement is the relatively low pressure differential which can be achieved because of the continuous leakage of air under the retained object. A further consequence is the requirement for a vacuum pump capable of the on,going extraction of a large volume of air. The present invention proposes a solution to these problems whereby a much lower pressure can be maintained by a much smaller capacity pump underneath the retained object by virtue of air leakage being constrained by a labyrinthine seal system which is arranged like a grid, and acts between the table and the object. Additionally the vacuum is collected through a reservoir of very small cubic capacity, being merely a formed channel in the underside of the grid surface, enabling it to generate an overall low pressure rapidly. In the described arrangement the pressure differential is further enhanced because the entire arrangement acts within a chamber (the working volume of the machine) whose pressure is above atmospheric.

In an alternative form of cabinet suitable for mounting the mechanism and workpiece, the work cell is a very rigid monocoque structure which retains both the workpiece and the mechanism, a largely cosmetic plinth is provided to support the work cell and a hood is provided to enclose the retracting part of the mechanism. The work cell can be constructed out of foam or otherwise cored composite such as glass and/or carbon fibre and resin mixes. Carbon fibre is particularly suitable because the nature of the fibre and its bonding resin can be arranged to provide a near zero coefficient of thermal expansion. Carbon fibre also has an exceptionally high tensile strength. It will thus provide maximum stiffness at minimum weight and will consequently minimise low frequency resonances. The work cell resembles a wire frame cube, where the framework is replaced by right angled triangular beams such that each face of the cube is flat, with a rectangular hole in its centre, and the inner form has chamfers between all outside faces. The core of the triangular beams may be made of various densities of PVC foam. Within each face, a virtual tensile structure is maintained with the lay of the composite fibres withstanding the tension and compression forces and hence minimising the amount of material required and its subsequent mass. The structure can be produced as a single part, or where scale or costs causes this approach to be impractical, fabricated from a number of component parts. This could either be as a top and bottom component, or even a series of beam components bonded together at their matching ends with appropriate resins. A plinth can be bolted to the inside bottom face to retain the work-piece at the required elevation by various means. The top face retains the mechanism either, in the event of a single monocoque, as an extension of the framework with appropriate cut-outs, or by virtue of a mechanism carrying a subframe bolted into position in a similar way to the plinth. The composite skin may be protected by a series of ABS bumpers, and a sliding window system fits into all the vertical openings allowing access to the work-piece from any side.

Having thus described an embodiment of the present invention and various modifications by reference to their mechanical structure, in the following considerations relating to computer control of a mechanism in accordance with the invention will be described.

Conventional computer numerical control (CNC) software determines a procedure for machining a surface imported from a CAD system (or generated internally), and reduces the necessary movements and instructions to simple incremental move codes. A machine tool receiving these instructions would faithfully perform the prescribed commands irrespective of their consequences. In the invention which is herein described, an entire mathematical object model as produced by an industry standard 3D CAD system, is sent to the machine. The machine has sufficient machine intelligence to determine an integrated strategy to prepare the entire model without significant user intervention. This has necessitated software and control inventions in the following areas:

A method to import CAD models and from them to prepare high integrity geometrical surface data from models which may have been a tiled or faceted approximation.

A means to avoid undesirable collisions between the machine tool and workpiece either during machining or during movement around the model.

A method to remove the bulk or any superfluous material from the workpiece, keeping the cutting action working at optimum efficiency, and avoiding collisions.

A method of machining down to the final surface, using normal and tangential tool angle control to produce smooth surfaces efficiently, whilst still avoiding collisions.

A method of automatically determining the optimum machining conditions using an 'expert system' technique.

Interaction with the software is provided through a soft control panel. All options are accessed via a flexible user interface that includes icons, menus and on-screen buttons. The interface is relatively clear and uncluttered because only valid options for a given operating state are presented. Also, the icons and menus are under complete user control, allowing each user to interact with the system in the way he or she prefers, thus the interface is reconfigurable by the user to meet each user's specific needs.

The software has been designed to take input in a variety of standards from different 3-D CAD systems, in formats such as SXF, IGES, Romulus, CADDS4X, VDA-FS, SET, or DXF. Imported geometry is converted to an internal data format and stored in an internal database for access by the different program modules in the software. For example, an N-sided plane facet is stored in the following format:

```
typedef struct
{   int begin;
    int end;
    unsigned char col;
    unsigned char num;
    unsigned char display;
    int depth;
    int surface;
    float tilt;
    float normal[3];
    float P[4] [4] [3];
    int repcorner;
} facetRcd;
int   *facetpts;
int   *facetnbrs;
float       (*corner) [3];
float       (*cornernormal) [3];
facetRcd *facet;
``` where 'begin' and 'end' are pointers into the 'facetpts' array which identifies the corners, or nodes, of the facet; 'col', 'display' and 'depth' are for displaying purposes; 'surface' identifies the parent surface; 'tilt', the angle from the viewing vector; 'normal', the normal vector of the centre point in the facet; 'P' is a matrix which links in to the surface blending functions; and 'repcorner' is the means of converting three-sided facets into four-sided ones for smoothing.

The user can view the imported model, together with any subsequent modifications made as a result of surface blending, for instance, from any angle, or simultaneously display any combination of front, side, top and true perspective views. The software allows zoom, pan and rotation of any view dynamically in 3D. Views can either be shaded or wireframe image of the model. Hidden lines can be retained or removed. When multiple views of a model are displayed simultaneously, each view can be configured individually. For example, one view can be shaded and another can be wireframe with hidden lines removed. The software includes the ability to quickly redraw a perspective view in real-time, to simulate walking around the model, inspecting it from any viewpoint. As the software includes a modeller of the boundary representation type, it needs explicit details of all faces, edges, and vertices of the model as it was originally constructed. The modelling software recognises more than 20 different types of surface. These range from simple planes to fillet and curve-driven surfaces to four types of free-form surface. Three types of 3-D splines are supported (continuous 2nd derivative, Bezier, and Non-Uniform Rational B-Spline). Included is a method for automatic feature recognition whereby individual surfaces derived from curves of rotation, such as spherical or conical surfaces, and surfaces produced from extrusions, such as cylindrical, can be recognised from the original faceted model. Also general smooth surfaces are derived from arrays of node points. The boundary line of each surface is also accurately calculated. Thus the original form can be put back into an imported faceted model.

As well as having built-in libraries of standard cutting tool shapes, such as cylindrical, dovetail, conical, and barrel cutters, the software also allows the user to define his own tool shapes. The mathematical properties of each tool type are stored in a tool database and are used in final cutting to compute scallop height, step-overs and for collision detection. A text description is associated with each tool to develop a portable tool coding system and tool libraries. Tool data includes such parametric information as is necessary, such as cutter definition, number of teeth, tool material and plunge or no plunge.

The 5-axis Computer Aided Manufacturing (CAM) functions provide the capabilities of generating, verifying, modifying and outputting tool paths which regulate and guide the operation of the machining process. These functions allow the machining of 3-D curves, and automatically determine the depth or depths at which the geometry will be machined. Unlimited 5-axis side and base cuts to rough and/or finish tolerances are supported. The machining software considers the availability of the variety of cutting tools in the autochange rack, each with different capabilities. The system also minimises the number of different positions in which the part must be set up and clamped during the machining process. The appropriate feeds and speeds are chosen according to material, finish desired, etc. The tool path generation software makes allowance for avoidance of any clamps and fixtures during the machining process. In simulation mode the software completely controls the dynamic tool display as the path is generated. Colours are assigned to particular feedrate changes, and the tool instance, and tool path segment. As described below, the software has the ability to check the tool volume against the part machined solid, so the system no longer has to guess as to what material was removed by each tool. A 3-D bitmap representation of the part machined solid is created at each stage of the machining process. Collision detection is also a natural result of machining with a bitmap solid, so the software prevents collision or gouging and does not need continual re-adjustments at the machine tool.

The operation of rough cutting is completely automatic for the operator once the object has been positioned correctly inside the volume of the uncut block. The method utilized is based on the decomposition of the volume of the solid to be machined into a regular 3-D array of uniform cuboid cells. The size of the cells is related to the dimensions of the cutting tool to be used. The mesh orientation is chosen at the start of machining. There are three kinds of cells: (1) cells purely internal to the part, (2) purely external cells, and (3) boundary cells. Boundary cells are partly occupied by material and partly empty. The initial rough-cut machining module then cleans out all the purely external cells in a sequence determined by their ordering in the 3-D cell array. The subsequent fine machining is based on a final cut strategy as described hereinafter. It is possible to use a method of spacial decomposition which is more refined, for example, based on a 3-D array of different sized non-uniform cells where larger cells are used to represent larger homogenous volumes. One advantage of this approach is that finer spacial resolution may be achieved in the boundary area for the same amount of computer memory.

Construction of the 3-D cell array is as follows:

1. For each facet with more than four sides, and any four-sided facets which include a concave angle, subdivide into a number of smaller sub-facets. Each sub-facet is either three-sided or convex four-sided. Choose the dividing lines on the original facet such that the statistical deviation of the included angles are minimised about the average angle.
2. Then reconstruct the original surface of the facet through the node points of the corners of the facet. For example, in the case of a bicubic surface of the type with continuous second derivates, reconstruct the tangent vectors, normal vectors and twist vectors at each corner. Select the parameters such that a smooth blend is achieved in the third derivative with the neighbouring facets in the same surface.
3. Then, for each of these facets, calculate the offset surface at a distance corresponding to the desired depth of material remaining after the removal of the main bulk of material in the roughing cycle.
4. On the offset surface, calculate an array of $\{x,y,z\}$ coordinates such that the density of coverage in a parametric sense corresponds as closely as possible to a uniform grid pattern on the surface.
5. Create the 3-D cell array and label all cells as being purely internal.
6. For each node in the grid, indicate in the 3-D cell array that this position is a boundary one, ie part material and part empty.
7. Project a series of beams from the outside faces of the block in an inwards direction. For each ray in each beam, the cell in the 3-D array which corresponds to the position of the start of each ray is labelled as purely external. All subsequent cells on the path of the ray are also identified as purely empty, but only up to the point at which a boundary cell is reached.
8. Any cells which are purely internal neighbouring purely external ones are converted into purely external.

The algorithm which calculates the tool path for the roughing cycle is also completely automatic, requiring no user intervention. The method of working is as follows:

1. Determine all the cells in the 3-D array which are both purely external and neighbouring an empty one and change their label to 'machinable'.
2. Ensure the spindle motor is on.
3. Move the tool head to the position of the nearest machinable cell in the 3-D array that is reachable without collision. Set the orientation of the tool head so that no collision takes place with either the non-empty cells or any supporting fixtures. Change the label of the cell from machinable to empty.
4. Search for the nearest and highest 'machinable' neighbouring cell.
5. If the cell is an immediate neighbour then move the tool head to that position without leaving the material so as to continue cutting. If not, then move the tool head so that it physically withdraws from the material and moves through empty space to the position of the cell. To affect this motion through empty space without collision, and with ramped take-off and landing, use the point-to-point movement algorithm as described below.
6. If the cell is not reachable through any orientation of the tool head then ignore it, and take the next candidate from (4).
7. If no machinable cells are found within a pre-determined distance, set to an amount which correlates with the distance achieved through motion in the time for the calculation to take place, then stage (1) is repeated to generate a new machinable surface.
8. Then stages (4)–(6) are repeated until no more purely external material exists in the cell array, or more strictly until no further reduction in their number is possible.

At this point the roughing cycle is complete as far as is possible with the current tool bit and object orientation.

Final cut strategy is automatic and no user input is needed except for specifying the desired accuracy and quality of the surface finish. These may be either the same for each surface on the object as a whole or differently specified for different surfaces. A built in database of tool types available selects the appropriate tool for final cutting. Speeds and feed rates are also automatically selected, and are dependent on the parameters in the database corresponding to the material type selected. An option exists for the user to override these settings if needs be. It is assumed, at this point in the software, that any collections of facets representing smooth curved surfaces have been processed such that the data for the original surface (or near approximation) has been recalculated. Note that this was also the case in calculation of the offset surfaces in the rough cut strategy. The default method of final cut operation is as follows:

1. Surfaces are machined in order of concavity, starting with the least concave and most convex. A tool is selected with a radius of curvature corresponding to the minimum radius of curvature in the area of the surface or part surface to be machined.
2. The second criteria for ordering, after (1), is that surfaces or part surfaces are machined in order of rotation about the vertical. This ensures that index changes in the mechanism of the 7th axis are kept to a minimum.
3. The next criteria for ordering after (1) and (2) is top down, ie start at the top and work to the bottom.
4. Part surfaces are linked together automatically by the system from facet data and from blending data, input by the operator in previous operations.
5. The outer perimeter of the area to be machined is cut by moving the boundary line inwards by an amount equal to the radius of the cutter and cutting with the edge.
6. The inner part of the area is cut on a series of tracks of diminishing radii. When islands are formed they are locally cut. An inner boundary is cut on the opposite edge and in the same way as the outer edge.

There are several collision detection methods employed for ensuring that the tool head does not collide with the part machined object or any jigs and fixtures. Most are based on checking points on the surface of the toolhead against the 3-D cell array, as constructed in the rough cut operation above. In final cutting, in particular when moving quickly through the empty space, this method is assisted with a point-to-point algorithm operating on the facet node points and elements in the 3-D cell array. In the surfacecell check, every point on the surface is only occasionally checked because this takes quite a long time. Hence 90% of the checks involve a check on only 10% of the surface, only 10% of the checks include the remaining 90%. The actual ratios are variable depending on hit rate, and point-to-point results. When a collision is predicted, the actual positions of the points of contact in the surface, in relation to the centre point of the cutting bit and the centreline of the spindle motor, are fed back to the tool head control software which then incrementally tilts the head away in the opposite direction for a recalculation before the move is effected.

The machine can also be operated as a simulation of a controller for a multi-axis CNC milling machine. In such an operation G-codes and M-codes can be interpreted directly, or G-codes and M-codes may be generated internally by interpretation of higher level controller commands.

The algorithm which converts the head setpoint position into leg lengths is based on a matrix transformation of the set of vectors which define the relative positions of the ball-joints with respect to the apex of the spindle motor. The tangent vector in the direction of motion at the apex determines the rate of change in the lengths of the legs. The second derivative of the vector which defines the position of the apex is used in the feedforward part of the acceleration control loop in the processing units as described hereinafter. The algorithm is as follows:

1. Calculate the matrix of vectors which define the node points in the head assembly. This data is obtained from a pre-programmed table of values, and may be changed after an auto-calibration.
2. Store the matrix in the position {0,0,0} with rotation {0,0,0}
3. Convert the desired cutter location and normal vector into a transformation matrix.
4. Transform the geometry in (2) with (3).
5. Obtain the leg lengths with a vector subtraction of the base unit and transformed balljoint positions and by taking the modulus. Add the new value for each axis to the input list to the spline generator and calculate the new spline parameters. The particular spline algorithm may be one of several types including for example, parabolic, cubic, Hermite, or B-spline. The calculations must include a check on exceeding physical limits for acceleration or deceleration of the mechanism and adjust the timebase of calculation amongst all the axes simultaneously to maintain positional synchronisation. End conditions are only a problem at the start of the calculations as the process is recursive, so a pre-start sequence is generated in software to get the calculations going.
6. Add the new parameters to the end of the list in the communications buffer for downloading to the processing units.

A motion control system coordinates movement of the subframe unit in all of the multiple axes of movement. The control system uses one processing unit for the control of each leg in a mode of parallel computation. There are six legs connecting the subframe unit to the chassis of the machine so there are six processing units. The coordination between each of the processing units is controlled by a central computational unit. This central computational unit performs executive and supervisory tasks whilst the parallel processing units perform low level tasks. The low level tasks include the feedback loop, motor commutation, and trajectory generation for the control of the length of the leg. Some status information about the axis, e.g. limits, motor slip, tracking error, are gathered by each processing unit for communication to the master on a query basis through a dual-port RAM. With this parallel configuration the servo cycle time remains constant ensuring uniform servo performance for the entire system.

All control information goes through the central computational unit, which controls via downloadable protocols the communications between the axes. The protocols determine what can wait until the normal place in the software cycle, under what conditions a single axis can affect the motion of the other axes, and establish what must be responded to immediately. The computational and communications requirements of the central computational unit are designed such that a standard high performance personal computer can be used. The timebase is shared by using a common clock signal among the axes. Motion synchronisation between multiple axes allowing simultaneous start of a sequence of moves is achieved by enabling the central computational unit to talk to all of the individual processing units simultaneously. The central computational unit can address each axis individually or address all axes at once. The synchronization of motion through intermediate path points is effected by ensuring that the entire path through space is well-defined and ensuring that the interpolation between axes is coordinated. This coordination is done both in the central computational unit and in the parallel processing units.

Several types of interpolation are supported by the processing units. In order to achieve best positional control of the subframe unit in space, each move is broken into a series of sections with spline position and velocity profiles. This splining of position moves supports other types of move, with algorithms falling out as a degenerate case. For each section of the move, the starting and ending positions, velocities, and times, together with the spline parameters, are given to each axis. Each processing unit has a buffer capability in order to allow a degree of non-synchronisation in the calculations occurring in the central computational unit and in the execution of the moves. Semaphore logic provided for in the communications protocol between the central computational unit and the processing units ensures integrity of control execution. Hence there is a wide tolerance permissible in the preparatory calculations which are worked in smoothly with the ongoing servo computations. In this manner the sections are blended smoothly. Digital signal processing devices are preferably used because of the suitability of their architecture to the mathematics intensive motion control calculations. A fast load resonance filter algorithm with two poles and zeros is used with acceleration and velocity feedforward to ensure accurate tracking of trajectories. A PID loop with velocity feedback is used with position integration to permit zero following error operations. Particular design features in the implementation of the processing unit may be as follows: (1) dual port RAM interface, 16 bits wide, 70 ns access time, (2) Texas Instruments TMS320C10 digital signal processor, (3) microstepping Control with up to 3200 microsteps/rev at speeds up to 50 revs per second, (4) drive currents up to 2 A phase, (5) 40 V supply voltage, (6) support for external limit switches for calibration and homing purposes, (7) on board diagnostics, (8) automatic stand-by power reduction mode. An optical encoder attached to each movement axis may accommodate varying speeds using an A/B quadrature incremental position counter up to a maximum of 100 kHz.

Having thus described the present invention by reference to a particular embodiment, it is to be well appreciated that the invention is not limited to the embodiment described but that modifications and variations are possible without departure from the spirit and scope of the invention.

We claim:

1. A mechanical movement system for locating an effector relative to an object, said system comprising:
   a mounting;
   a base for further movement, said base being mounted for movement in translation and rotation relative to said mounting by means of a plurality of legs extending between the mounting and the base, means to adjustably control the length of the legs wherein the effective length of said legs is controllably adjustable for determining the orientation of the base relative to the mounting and the connection of the legs to the mounting and to the base being such as to accommodate changes in the angular orientation of the legs consequential to adjustment of their effective length; and
   means coupled to said base and providing for movement of an object mounted on said base additional to the base movement arising out of movements of the legs;
   said additional movement providing means comprises first controllably adjustable means providing for a first degree of movement relative to the base, and second controllably adjustable means mounted on said first controllably adjustable means and providing for a different degree of movement relative to said base to that provided by the first controllably adjustable means.

2. A system as claimed in claim 1 wherein the base for further movement comprises a platform having three pairs of supportive legs coupled thereto at triangularly spaced-apart locations by means of three universal joints each of which couples to one end of each of the two legs of a respective pair, and the two legs of each pair extend from their respective universal joint in divergent directions to spaced-apart locations in said mounting whereat each leg is drivingly engaged by controllable leg drive means for moving the leg in its own longitudinal direction, the leg drive means associated with each leg being mounted so as to be capable of accommodating angular movement of its respective leg.

3. A system as claimed in claim 2 wherein the triangularly spaced-apart locations whereat the three pairs of supportive legs couple to the platform are equilaterally spaced apart, and the locations in the mounting whereat the legs are drivingly engaged by the leg drive means are arranged in a hexagon wherein the spacing between the respective locations for the two legs of each pair of legs are uniform as between the three pairs of legs, and the spacings between the adjacent legs of different pairs of legs are uniform.

4. A system as claimed in claim 2 wherein the leg drive means comprise electric motors drivingly engaged with screw threads provided on the legs.

5. A system as claimed in claim 2 wherein the leg drive means are mounted in the mounting by universal joint means.

6. A system as claimed in claim 5 wherein said universal joint mounting the leg drive means comprise gimbal means.

7. A system as claimed in claim 5 wherein said universal joint means mounting the leg drive means comprise ball and socket means.

8. A system as claimed in claim 7 wherein said ball and socket means mounting the leg drive means comprises a spherical ball within which is housed the leg drive means, an annular collar having an internal part-spherical surface for capturing said spherical ball, and means providing interaction between the ball and the annular collar for permitting rotational movement of the ball in the socket in all directions except about the longitudinal axis of the respective driven leg.

9. A system as claimed in claim 8 wherein at least one longitudinal groove is provided in the external surface of the spherical ball and a groove-follower is mounted in the annular collar for rotation about an axis radial to the internal part-spherical surface of the collar, the groove follower engaging in the groove so as to permit movement of the spherical ball in the annular socket in a sense such as relatively to translate the groove-follower in the groove and inhibit movement transverse to such permitted movement.

10. A system as claimed in claim 9 wherein the groove follower comprises a slider defined by a projection from a surface of a first member and an opposite surface of said first member is received within an accommodating recess in a second member mounted in said annular collar so as to define the axis of rotation of the first member, the internal surface of said recess mating with the respective surface of the first member and each surface comprising a plurality of equal-radius, axially displaced spherical portions enabling self-centering of the first member with respect to the second whilst permitting the requisite rotation of the first member.

11. A system as claimed in claim 2 wherein the universal joints coupled the ends of respective pairs of the legs to the platform comprise ball and socket means.

12. A system as claimed in claim 11 wherein the ball and socket means include magnetic means arranged to hold the ball in the socket by magnetic attraction.

13. A system as claimed in claim 11 wherein the ends of the legs are coupled to or together define the ball of the ball and socket means and the ends of the legs are arranged to pivot with respect to each other in a common plane, and reception of the ball in the socket provides for omnidirectional rotation of said plane.

14. A system as claimed in claim 1 wherein said first controllably adjustable means is arranged to provide controlled rotational adjustment in a plane parallel to a plane defined by the platform.

15. A system as claimed in claim 14 wherein said first controllably adjustable means comprises a motor driven member rotatably mounted with respect to the platform.

16. A system as claimed in claim 15 wherein indexing means are provided associated with said motor driven member and with the platform whereby the motor driven member may be accurately positioned at any one of a plurality of predetermined positions relative to the platform.

17. A system as claimed in claim 16 wherein one of said platform and said motor driven member is provided with a plurality of circumferentially spaced-apart elements defining predetermined positions between adjacent ones thereof, and the other of said platform and said motor driven member is provided with at least one locating member adapted to locate between adjacent ones of said elements to predetermine the relative positions of the platform and the motor driven member.

18. A system as claimed in claim 17 wherein camming means are provided for drivingly engaging the said at least one locating member and the respective elements for precisely predetermining the relative position of the platform and the motor driven member following coarse positioning of the same by means of the motor drive provided to the motor driven member.

19. A system as claimed in claim 17 wherein three said locating members are provided angularly spaced apart by 120 degrees.

20. A system as claimed in claim 15 wherein the motor driven member and the platform, or elements affixed thereto, comprise a plurality of radially spaced-apart annular grooves with a first set of grooves on one of the two members being complementarily shaped with respect to and engaging in a second set of grooves on the other of the two members.

21. A system as claimed in claim 20 wherein complementarily shaped surfaces of the two sets of grooves are spherical whereby the arrangement simulates a part spherical ball fitting into a part spherical socket, the grooves thereby serving to self-center the relatively rotating parts.

22. A system as claimed in claim 15 wherein said motor driven member is arranged to be rotatable to continuously variable positions, at least one electric motor driving the driven member via a gearing arrangement providing constant loading of the driven member, and an interface between the rotatably mounted driven member and the platform comprising bearing surfaces each formed with a plurality of radially spaced apart annular grooves and with the two sets of grooves being shaped complementarily and interengaging with each other.

23. A system as claimed in claim 20 wherein a hydrodynamic lubricant is provided between the two sets of grooves.

24. A system as claimed in claim 14 wherein said second controllably adjustable means is arranged to provide controlled rotational adjustment in a plane generally transverse to the plane defined by the platform.

25. A system as claimed in claim 24 wherein said second controllably adjustable means comprises a motor driven pivotal arrangement.

26. A system as claimed in claim 25 wherein said motor driven pivotal arrangement comprises a motor driven push-rod arrangement pivotally mounted with respect to the first controllably adjustable means, and a head member pivotally mounted with respect to said first controllably adjustable means and arranged to be controlled as regards its pivotal position by being coupled to the push-rods, said head member pivotable about a pivot axis.

27. A system as claimed in claim 26 wherein said pivotally mounted head comprises a motor adapted to provide rotational movement about an axis transverse to the pivot axis.

28. A system as claimed in claim 27 wherein said pivotally mounted head comprises a tool-holder arranged to be rotated by said motor.

29. A system as claimed in claim 28 wherein said tool-holder includes mounting means such that said tool-holder is automatically interchangeable.

30. A system as claimed in claim 29 wherein said mounting means of the tool holder is such as to enable the tool holder to be selectively clamped with respect to the motor whereby changing of the tool holder can be effected or assisted by taking advantage of forces developed by operation of preceding powered parts of the system.

31. A system as claimed in claim 1 wherein said plurality of legs extend from said mounting to one side of said base for further movement, and said means coupled to said base and providing for additional movement is coupled to the base on another side thereof.

32. A system as claimed in claim 1 wherein the mounting of one or more components of the system includes a Kelvin clamp arrangement precisely determining the position of the component in the system, said Kelvin clamp arrangement comprising three struts angularly spaced apart from each other by 120 degrees and three mating saddles such that the arrangement has only one settling point in 6-axis space.

33. A machine tooling apparatus comprising the system of claim 1, further comprising:

means for locating a workpiece adjacent said system;

means for retaining a cutting tool, wherein said cutting tool retaining means is secured to said second controllably adjustable means such that movement of said second controllably adjustable means effects movement of said cutting tool for machining a workpiece located by said workpiece locating means.

34. A machine tooling apparatus of claim 33 wherein said workpiece locating means comprises a vacuum operated workpiece retaining means which includes a labyrinth elastomeric seal adapted to underlie the workpiece and distribute the applied vacuum over a surface thereof.

35. A machine tooling apparatus of claim 33 wherein said system includes a cabinet comprising upper, central and lower sections and a means for machining, the machine tooling apparatus being arranged to effect machining operations within said central section, one of the other sections containing air blowing and swarf collection systems, and the other of the other sections containing control systems for the apparatus.

36. A system as claimed in claim 1 and including means defining an airflow passageway from said mounting and down said plurality of legs, past the controllable adjustment means associated therewith and to and through said base for further movement, and past said first and second controllably adjustable means coupled to said base.

37. A system as claimed in claim 1 claims in combination with a computer system controlling the operation of the system.

38. A system as claimed in claim 37 wherein said computer system includes computer aided design facilities enabling an operator to formulate the design of an object and is adapted to effect automatic computer aided manufacture of the designed object utilizing data generated in use of the computer aided design facilities.

39. A machine tooling apparatus comprising the system of claim 1, further comprising;

means for locating a workpiece adjacent said system;

means for retaining a cutting tool, wherein said cutting tool retaining means is secured to said second controllably adjustable means such that movement of said second controllably adjustable means effects movement of said cutting tool for machining the workpiece located by said workpiece locating means;

a computer system for controlling the operation of the mechanical movement system; wherein said computer system includes computer aided design facilities enabling an operator to formulate the design of an object and is adapted to effect automatic computer aided manufacture of the designed object utilizing data generated in use of the computer aided design facilities; and wherein said computer aided design facilities maintain a 3-D bitmap representation of the part machined workpiece at each stage of the machining process and effect collision avoidance procedures relative to said 3-D bitmap representation to avoid collision between the cutting tool and the workpiece being machined both during machining and during movement of the cutting tool around the workpiece being machined.

40. A machine tooling apparatus comprising the system of claim 1, further comprising:

means for locating a workpiece adjacent said system;

means for retaining a cutting tool, wherein said cutting tool retaining means is secured to said second controllably adjustable means such that movement of said second controllably adjustable means effects movement of said cutting tool for machining a workpiece located by said workpiece locating means;

a computer system for controlling the operation of the system; wherein said computer system includes computer aided design facilities enabling an operator to formulate the design of an object and is adapted to effect automatic computer aided manufacture of the designed object utilizing data generated in use of the computer aided design facilities; and wherein the computer controlled machining of the object is based upon decomposition of the volume of the workpiece which is to be machined into a regular 3-D array of cuboid cells of a size related to the dimensions of the cutting tool, the system identifying cells wholly internal to the object to be manufactured, cells wholly external to the object, and boundary cells partially occupied by the object material, and being arranged to machine out wholly external cells in a rough-cut machining process before proceeding to fine machining of the boundary cells.

41. A system as claimed in claim 39 wherein the computer system includes a database of available machining tool types and selection of the cutting tool is effected in dependence upon the said database.

42. A system providing for relative rotation between first and second members and wherein bearing surfaces of said first and second members are each formed with a plurality of radially spaced apart annular grooves, the grooves of one member being complementary to those of the other whereby the two sets of grooves interengage with each other for determining the axis of relative rotation of the two members.

43. A system providing for relative rotation between first and second members and wherein bearing surfaces of said first and second members are each formed with at least one annular groove, the grooves of one member being complementary to those of the other whereby the two sets of grooves interengage with each other for determining the axis of relative rotation of the two members, wherein said grooves include spherical surfaces such that the mating of the two members simulates the mating of a spherical member into a complementary socket.

44. A jigging system for use in calibrating a system as claimed in claim 32 which utilizes one or more Kelvin clamp mounting arrangements, said jigging system comprising: a first jig having three identical, co-planar struts angularly spaced apart from each other by 120 degrees and a member defining a predetermined measuring position located equidistantly from said three struts; and a second jig having means defining three identical, co-planar mating saddles for said struts spaced apart from each other by 120 degrees and three members defining measuring positions located equidistantly between respective pairs of said saddles; the first and second jigs being adapted and arranged to simulate the respective Kelvin clamp mounting arrangement.

* * * * *